US009910984B2

(12) United States Patent
Valencia et al.

(10) Patent No.: US 9,910,984 B2
(45) Date of Patent: Mar. 6, 2018

(54) METHODS AND SYSTEMS FOR ON-DEVICE HIGH-GRANULARITY CLASSIFICATION OF DEVICE BEHAVIORS USING MULTI-LABEL MODELS

(71) Applicant: QUALCOMM Incorporated, San Diego, CA (US)

(72) Inventors: Andres Valencia, San Jose, CA (US); Vinay Sridhara, Santa Clara, CA (US); Yin Chen, Campbell, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 14/837,936

(22) Filed: Aug. 27, 2015

(65) Prior Publication Data
US 2016/0253498 A1    Sep. 1, 2016

Related U.S. Application Data

(60) Provisional application No. 62/121,946, filed on Feb. 27, 2015.

(51) Int. Cl.
| | | |
|---|---|---|
| *G06F 21/55* | (2013.01) | |
| *G06F 21/57* | (2013.01) | |
| *G06N 99/00* | (2010.01) | |
| *G06F 21/56* | (2013.01) | |

(52) U.S. Cl.
CPC ............ *G06F 21/554* (2013.01); *G06F 21/55* (2013.01); *G06F 21/566* (2013.01); *G06F 21/577* (2013.01); *G06N 99/005* (2013.01); *G06F 2221/034* (2013.01)

(58) Field of Classification Search
None
See application file for complete search history.

(56) References Cited

U.S. PATENT DOCUMENTS

| | | |
|---|---|---|
| 8,161,548 B1 | 4/2012 | Wan |
| 8,521,667 B2 | 8/2013 | Zhu et al. |
| 8,635,694 B2 | 1/2014 | Malyshev et al. |

(Continued)

OTHER PUBLICATIONS

International Search Report and Written Opinion—PCT/US2016/012327—ISA/EPO—May 31, 2016.

(Continued)

*Primary Examiner* — Michael R Vaughan
*Assistant Examiner* — Richard A McCoy
(74) *Attorney, Agent, or Firm* — The Marbury Law Group, PLLC

(57) ABSTRACT

Various aspects include methods and computing devices implementing the methods for evaluating device behaviors in the computing devices. Aspect methods may include using a behavior-based machine learning technique to classify a device behavior as one of benign, suspicious, and non-benign. Aspect methods may include using one of a multi-label classification and a meta-classification technique to sub-classify the device behavior into one or more sub-categories. Aspect methods may include determining a relative importance of the device behavior based on the sub-classification, and determining whether to perform robust behavior-based operations based on the determined relative importance of the device behavior.

26 Claims, 11 Drawing Sheets

(56) References Cited

U.S. PATENT DOCUMENTS

| | | |
|---|---|---|
| 8,775,333 B1 | 7/2014 | Zahn |
| 8,813,228 B2 | 8/2014 | Magee et al. |
| 2007/0214429 A1* | 9/2007 | Lyudovyk ............... G06F 3/048 715/772 |
| 2010/0174788 A1* | 7/2010 | Vitaldevara .......... G06Q 10/107 709/206 |
| 2013/0145472 A1* | 6/2013 | Ramabhatta .......... G06F 21/566 726/25 |
| 2013/0303154 A1 | 11/2013 | Gupta et al. |
| 2014/0051432 A1 | 2/2014 | Gupta et al. |
| 2015/0128267 A1* | 5/2015 | Gupta ................... H04L 63/145 726/23 |
| 2016/0029221 A1* | 1/2016 | Suarez Garcia ...... G06F 21/561 455/410 |
| 2016/0078347 A1* | 3/2016 | Salajegheh ............. G06N 5/04 706/12 |

OTHER PUBLICATIONS

Mohaisen A., et al., "Amal: High-Fidelity, Behavior-Based Automated Malware Analysis and Classification," 2014, 14 pages.

\* cited by examiner

METHODS AND SYSTEMS FOR ON-DEVICE HIGH-GRANULARITY CLASSIFICATION OF DEVICE BEHAVIORS USING MULTI-LABEL MODELS

RELATED APPLICATIONS

This application claims the benefit of priority to U.S. Provisional Application No. 62/121,946 entitled "Methods and Systems for On-Device High-Granularity Classification of Device Behaviors using Multi-Label Models" filed Feb. 27, 2015, the entire contents of which are hereby incorporated by reference.

BACKGROUND

Cellular and wireless communication technologies have seen explosive growth over the past several years. This growth has been fueled by better communications and hardware, larger networks, and more reliable protocols. As a result, wireless service providers are now able to offer their customers with unprecedented levels of access to information, resources, and communications. To keep pace with these enhancements, consumer electronic devices (e.g., cellular phones, watches, headphones, remote controls, etc.) have become more powerful and complex than ever, and now commonly include powerful processors, large memories, and other resources that allow for executing complex and powerful software applications on their devices. These devices also enable their users to download and execute a variety of software applications from application download services (e.g., Apple® App Store, Windows® Store, Google® play, etc.) or the Internet.

Due to these and other improvements, an increasing number of mobile and wireless device users now use their devices to store sensitive information (e.g., credit card information, contacts, etc.) and/or to accomplish tasks for which security is important. For example, mobile device users frequently use their devices to purchase goods, send and receive sensitive communications, pay bills, manage bank accounts, and conduct other sensitive transactions. Due to these trends, new and improved solutions that better identify and respond to malware and other non-benign device behaviors in resource-constrained computing devices, such as mobile and wireless devices, will be beneficial to consumers.

SUMMARY

The various aspects include methods of evaluating device behaviors in a computing device, which may include using a behavior-based machine learning technique to classify a device behavior as one of benign, suspicious, and non-benign, using one of a multi-label classification technique and a meta-classification technique to sub-classify the device behavior into a sub-classification that includes one or more sub-categories, determining a relative importance of the device behavior based on the sub-classification, and determining whether to perform robust behavior-based operations based on the relative importance of the device behavior. In an aspect, using the behavior-based machine learning technique to classify the device behavior as one of benign, suspicious or non-benign may include classifying the device behavior as a suspicious device behavior, and using one of the multi-label classification technique and the meta-classification technique to sub-classify the device behavior into the one or more sub-categories may include sub-classifying the suspicious device behavior into a sub-category selected from a group that includes Adware, Key Logger, Ransomware, Spyware, mRAT, Botnet, Phishing, Trojan, and Short Message Service (SMS) Fraudware. In a further aspect, determining the relative importance of the device behavior based on the sub-classification may include determining a severity of risk posed by the device behavior to the proper functioning of the computing device.

In a further aspect, the method may include balancing tradeoffs between amounts of processing, memory, or energy resources of the computing device that are used to analyze the device behavior and the severity of risk posed by the device behavior. In a further aspect, the method may include determining actuation operations based on the relative importance of the device behavior. In a further aspect, the operations of determining the relative importance of the device behavior based on the sub-classification and determining whether to perform the robust behavior-based operations based on the relative importance of the device behavior may include determining whether the device behavior is sub-classified into a high risk sub-category, and immediately terminating a software application program associated with the device behavior in response to determining that the device behavior is sub-classified into the high risk sub-category.

In a further aspect, the operations of determining the relative importance of the device behavior based on the sub-classification and determining whether to perform the robust behavior-based operations based on the relative importance of the device behavior may include determining that the device behavior is sub-classified into a high risk sub-category, performing robust analysis operations to determine with a high degree of confidence whether the device behavior is non-benign, and automatically terminating a software application program associated with the device behavior in response to determining with the high degree of confidence that the device behavior is non-benign.

In a further aspect, the operations of determining the relative importance of the device behavior based on the sub-classification and determining whether to perform the robust behavior-based operations based on the relative importance of the device behavior may include determining whether the device behavior is sub-classified into a low risk sub-category, and displaying a prompt that requests that a user of the computing device choose whether to uninstall or whitelist a software application program associated with the device behavior in response to determining that the device behavior is sub-classified into the low risk sub-category.

In a further aspect, using one of the multi-label classification technique and the meta-classification technique to sub-classify the device behavior into the one or more sub-categories may include applying a behavior vector information structure to one of a multi-classification classifier model and a meta-classifier model.

Various aspects may include a computing device having a memory and a processor configured with processor-executable instructions to perform operations of the methods described above.

Various aspects may include a computing device having means for performing functions of the operations of the methods described above.

Various aspects may include non-transitory processor-readable media on which are stored processor-executable instructions configured to cause a processor of a computing device to perform operations of the methods described above.

BRIEF DESCRIPTION OF THE DRAWINGS

The accompanying drawings, which are incorporated herein and constitute part of this specification, illustrate exemplary aspects of the claims, and together with the general description given above and the detailed description given below, serve to explain the features of the claims.

DETAILED DESCRIPTION

Figure 1:
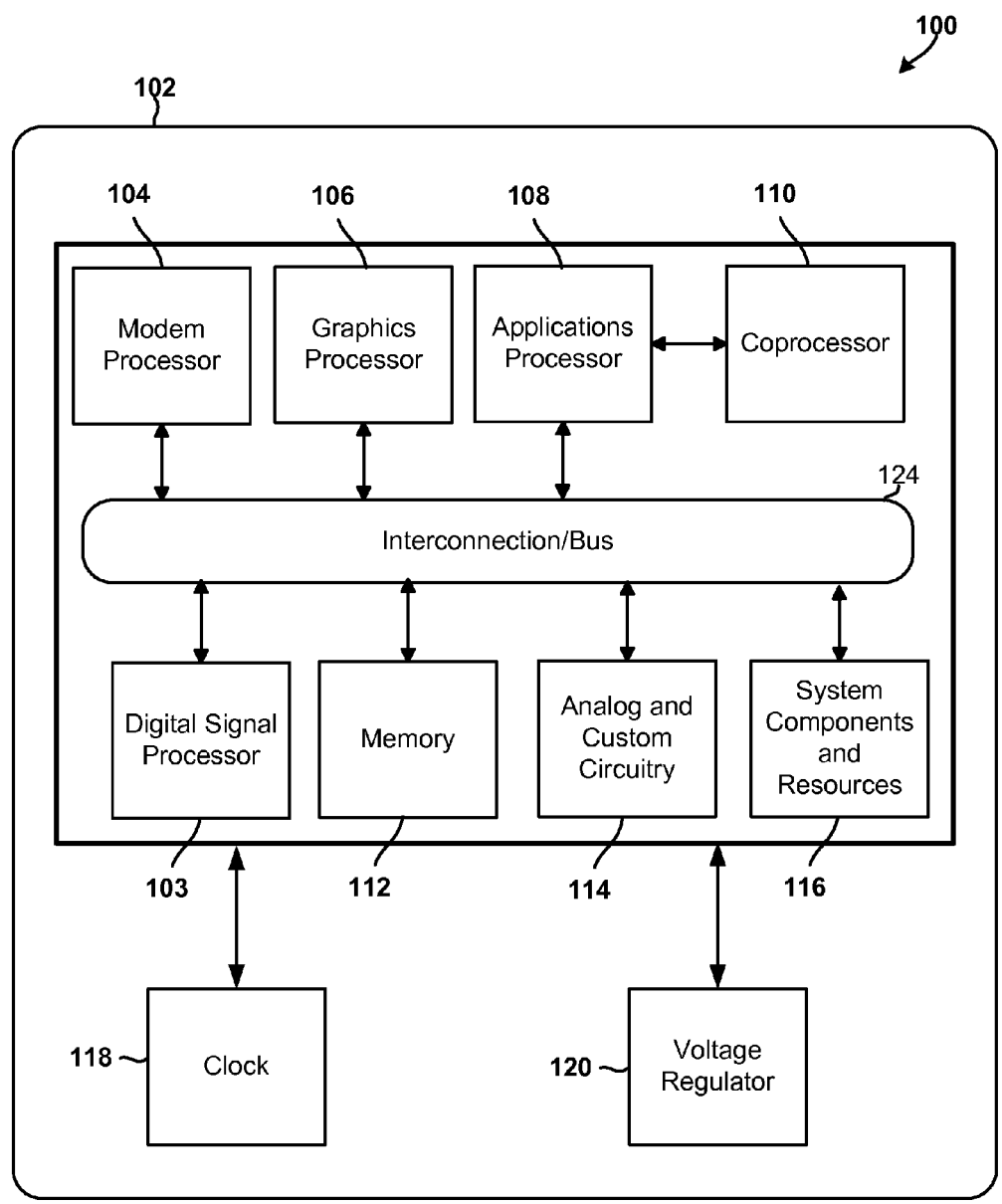
FIG. 1 is a block diagram illustrating components of an example system on chip that may be included in an aspect computing device and configured to use multi-label classification or meta-classification techniques to classify benign, suspicious, and non-benign behaviors into categories, sub-categories, groups, or sub-groups in accordance with the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, the various aspects include methods, and computing devices configured to implement the methods, of efficiently identifying, classifying, modeling, preventing, and/or correcting the conditions and behaviors that often degrade a computing device's performance, power utilization levels, network usage levels, security and/or privacy over time. The computing device may be configured to use behavior-based and machine learning techniques to efficiently classify device behaviors as benign, suspicious, or non-benign. The computing device may also be configured to use multi-label classification or meta-classification techniques to further classify (e.g., sub-classify, categorize, label, etc.) the benign, suspicious, and non-benign behaviors into categories, sub-categories, groups, or sub-groups. The computing device may also be configured to determine the relative importance of a behavior, such as the severity of risk or threat that an abnormality, software application, or behavior poses to the proper functioning of the device, based on that behavior's sub-classifications (e.g., based on the categories, groups or labels associated with that behavior).

In addition, the computing device may be configured to intelligently determine or select the analysis and/or actuation operations that are performed by the device based on the sub-classifications (e.g., based on the categories, sub-categories, groups, or sub-groups associated with the behavior) or relative importance of a behavior. For example, the computing device may be configured to determine whether to perform robust or lightweight analysis operations based on the categories, groups, or labels associated with a behavior. As another example, the computing device may be configured to classify a software application program as suspicious (or potentially non-benign), determine that the software application should be sub-classified into the abnormality or malware category and botnet sub-category, determine that the "botnet" sub-category is a high risk category, increase its level of security or scrutiny (e.g., by performing more robust analysis operations) to determine with a high degree of confidence whether the suspicious software application program is benign or non-benign, and automatically terminate the software application program in response to determining that the suspicious software application program is non-benign (i.e., is a botnet).

In some aspects, the computing device may also be configured to automatically select and perform actuation operations to heal, cure, isolate, fix, or otherwise respond to identified problems or non-benign behaviors based on the categories, groups, or labels associated with a behavior. For example, the computing device may be configured to classify a software application program as suspicious (or potentially non-benign), determine that the software application program may be sub-classified into the abnormality or malware category and adware sub-category, determine that the "adware" sub-category is a low risk category, and display a prompt that requests that the user select whether to terminate the application to allow it to continue operating on the device.

By sub-classifying the benign, suspicious, and non-benign behaviors, the various aspects allow the computing device to present the user with more useful or meaningful information about the behavior and/or provide the user with more control over how the device analyzes and responds to device behaviors. For example, if an adware program is included in a game that the user enjoys playing, rather than automatically terminating the adware and game, the system may allow the user to decide whether the negative characteristics of the adware program outweigh the benefits of playing the game.

In addition, by sub-classifying behaviors and determining their relative importance, the various aspects allow the computing device to better balance tradeoffs between the amounts of processing, memory, or battery resources that are used to analyze, classify, or respond to a behavior and the importance of that behavior to the proper functioning of the device. For example, the system may perform lightweight analysis operations if a potentially non-benign behavior is classified as adware, and more robust analysis operations if the potentially non-benign behavior is classified as a Trojan, rootkit, or botnet. This capability may improve the device's performance and power consumption characteristics by allowing the device to forgo performing spurious operations, balance its resource consumption based on the potential risk, and provide focused or customized responses to detected behaviors based on their classifications and sub-classifications. Additional improvements to the functions, functionalities, and/or functioning of computing devices will be evident from the detailed descriptions of the aspects provided below.

The word "exemplary" is used herein to mean "serving as an example, instance, or illustration." Any implementation described herein as "exemplary" is not necessarily to be construed as preferred or advantageous over other implementations.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs.

The term "performance degradation" is used in this application to refer to a wide variety of undesirable operations and characteristics of a computing device, such as longer processing times, slower real time responsiveness, lower battery life, loss of private data, malicious economic activity (e.g., sending unauthorized premium SMS message), denial of service (DoS), poorly written or designed software applications, abnormalities, malicious software, malware, viruses, fragmented memory, operations relating to commandeering the computing device or utilizing the device for spying or botnet activities, etc. Also, behaviors, activities, and conditions that degrade performance for any of these reasons are referred to herein as "not benign" or "non-benign."

Many modern computing are resource constrained systems that have limited processing, memory, and energy resources. For example, a mobile device is a complex and resource-constrained computing device that includes many features or factors that could contribute to its degradation in performance and power utilization levels over time. Examples of factors that may contribute to this performance degradation include poorly designed software applications, malware, viruses, fragmented memory, and background processes. Due to the number, variety, and complexity of these factors, it is often not feasible to evaluate all of the various components, behaviors, processes, operations, conditions, states, or features (or combinations thereof) that may degrade performance and/or power utilization levels of these complex yet resource-constrained systems. As such, it is difficult for users, operating systems, or application programs (e.g., anti-virus software, etc.) to accurately and efficiently identify the sources of such problems. As a result, users of mobile and other resource-constrained computing devices currently have few remedies for preventing the degradation in performance and power utilization levels of their devices over time, or for restoring an aging device to its original performance and power utilization levels.

To overcome the limitations of conventional solutions, computing devices may be equipped with a behavioral monitoring and analysis system (e.g., a behavior-based security system) that is configured to perform real-time behavior monitoring and analysis operations to quickly and efficiently identify behaviors and software applications that are non-benign (e.g., applications that are malicious, poorly written, incompatible with the device, etc.), and prevent such behaviors/applications from degrading the device's performance, power utilization levels, network usage levels, security, and/or privacy over time. By using behavior-based and machine learning techniques, the behavioral monitoring and analysis system may identify, prevent, correct, and/or otherwise respond to identified problems without having a significant, negative, or user perceivable impact on the responsiveness, performance, or power consumption characteristics of the computing device. As such, the system is well suited for inclusion and use in mobile and resource constrained-computing devices, such as smartphones, which have limited resources, run on battery power, and for which performance and security are important.

In the various aspects, the behavioral monitoring and analysis system may include an observer process, daemon, module, or sub-system (herein collectively referred to as a "module"), a behavior extractor module, an analyzer module, and actuator module. The observer module may be configured to instrument or coordinate various application programming interfaces (APIs), registers, counters, or other device components (herein collectively "instrumented components") at various levels of the computing device system (e.g., at the hardware, driver, kernel, NDK, SDK, and/or Webkit levels, etc.), collect behavior information from the instrumented components, and communicate (e.g., via a memory write operation, function call, etc.) the collected behavior information to the behavior extractor module.

The behavior extractor module may use the collected behavior information to generate behavior vector information structures (herein "behavior vectors") that each represent or characterize many or all of the observed behaviors associated with a specific software application, module, component, task, or process of the computing device. Each behavior vector may encapsulate one or more "behavior features." Each behavior feature may include an abstract number or symbol that represents all or a portion of an observed behavior. In addition, each behavior feature may be associated with a data type that identifies a range of possible values, operations that may be performed on those values, meanings of the values, etc. A computing device may use the data type to determine how the feature (or feature value) should be measured, analyzed, weighted, used, etc.

The behavior extractor module may communicate (e.g., via a memory write operation, function call, etc.) the behavior vectors to the analyzer module, which may apply the behavior vectors to classifier models to generate analysis results that may be used to determine whether a software application or device behavior is benign or non-benign. A classifier model may be a behavior model that includes data and/or information structures (e.g., decision nodes, feature vectors, component lists, etc.) that may be used by the computing device processor to evaluate a specific factor, feature, or aspect of the device's behavior. A classifier model may also include decision criteria for monitoring or analyzing a number of features, factors, data points, entries, APIs, states, conditions, behaviors, software applications, processes, operations, components, etc. (herein collectively "features") in the computing device.

A full classifier model may be a robust data model that is generated as a function of a large training dataset, which may include thousands of features and billions of entries. A lean classifier model may be a more focused data model that is generated from a reduced dataset that includes or prioritizes tests on the features/entries that are most relevant for determining whether a particular mobile device behavior is not benign. A locally generated lean classifier model is a lean classifier model that is generated in the computing device. A reduced feature model (RFM) may be a lean classifier model that is generated based on a more robust classifier model to include the decision nodes that evaluate the features that are most important for determining whether a behavior of that device is benign or non-benign.

The analyzer module may notify the actuator module when it determines with a high degree of confidence (e.g., based on the analysis results, etc.) that a behavior or software application is non-benign. In response, the actuator module may perform various operations to heal, cure, isolate, or otherwise fix the identified problem(s). For example, the actuator module may be configured to quarantine a software application that is determined to be an abnormality or malware, terminate a malicious process, display a prompt requesting that the user select whether to uninstall or whitelist an application determined to be non-benign, notify the user that a software application is contributing to the device's performance degradation over time, etc.

Monitoring, analyzing, and otherwise responding to every potential non-benign behavior may consume a significant amount of the device's limited processing, memory, or energy resources. For example, there may be thousands of features/factors and billions of data points that require monitoring or analysis in order to properly identify the cause or source of a computing device's degradation over time. In resource-constrained computing devices, such as smartphones, it is often not feasible to evaluate all these features, factors, and data points.

To reduce the number of features, factors, and data points that require evaluation when determining whether a behavior is benign, suspicious, or non-benign, the behavioral monitoring and analysis system may perform progressive, dynamic, and adaptive operations. For example, the system may be configured to use classifier models of varying levels of complexity (or "leanness") to progressively evaluate device behaviors in stages. This allows the device to forgo performing spurious operations and reduces the number of behavior vectors that are generated or used by the system.

For example, in some aspects, the system may be configured to generate and use a family of classifier models that includes an initial classifier model and one or more subsequent classifier models. The initial classifier model may be a lean classifier model (or a reduced features model) that focuses on evaluating a targeted subset of all the features, factors, and data points that would otherwise require analysis when classifying a mobile device behavior. Said another way, the initial classifier model may include decision nodes for evaluating an initial set of factors/features that are determined to have a high probability (e.g., 51%, 80%, 90%, 99%, or 99.9%) of enabling the system to determine whether a device behavior is benign or non-benign with a high degree of confidence. Each subsequent classifier model may be a more robust classifier that includes a larger number of decision nodes and/or evaluates a larger subset of the features, factors, and data points than its preceding classifier model. In some aspects, the computing device may determine whether a behavior, feature or factor has a high probability (as opposed to a low probability) of enabling the system to determine whether a device behavior is benign or non-benign with a high degree of confidence (as opposed to a low high degree of confidence) by comparing a value associated with the behavior, feature, or factor to one or more threshold values, or by using any other similar technique known in the art.

The system may apply behavior vectors to the initial classifier model to generate initial analysis results, determine whether the initial analysis results indicate whether the behavior is benign or non-benign with a high degree of confidence, classify the behavior as suspicious in response to determining that the behavior cannot be classified as either benign or non-benign with a high degree of confidence, apply the same or different behavior vectors to progressively larger or more robust classifier models to generate new or additional analysis results (e.g., in response to determining that the behavior is suspicious), and determine whether the new/additional analysis results indicate whether the behavior is benign or non-benign with a high degree of confidence. The system may perform these operations continuously or repeatedly until the analysis results indicate with a high degree of confidence that the behavior is benign or non-benign, until all of the classifier models in the family have been used, until a processing or battery consumption threshold is reached, or until the system determines that the source of the suspicious or performance-degrading behavior cannot be identified from the use of larger or more robust classifier models or from further analysis of the collected behavior information.

In addition, the system may be configured to perform/collect coarse observations and determine whether to perform/collect additional or more detailed observations based on a result of analyzing the coarse observations. The system may perform coarse observations by collecting behavior information from a small subset of all factors that could contribute to the mobile device's degradation over time, use this collected behavior information to generate behavior vectors, apply the generated behavior vectors to classifier models to generate analysis results, and determine whether the analysis results indicate whether the behavior is benign or non-benign with a high degree of confidence. The system may classify the behavior as suspicious in response to determining that the behavior cannot be classified with a high degree of confidence as benign or non-benign. In addition, the system may adjust the granularity of its observations (i.e., the level of detail at which the device behaviors are observed) and/or change the factors that are observed to collect new or additional behavior information, generate new behavior vectors based on the new or additional behavior information, apply the new behavior vectors to the same or different classifier models to generate additional analysis results, and determine whether the new/additional analysis results indicate with a high degree of confidence whether the behavior is benign or non-benign. The system may perform these operations repeatedly or continuously until the analysis results indicate with a high degree of confidence that the behavior is benign or non-benign, until a processing or battery consumption threshold is reached, or until the system determines that the source of the suspicious or performance-degrading behavior cannot be identified from further increases in observation granularity.

The above-described system is effective for determining whether a behavior is benign, suspicious, or non-benign without consuming a significant amount of the device's limited resources. Yet, there are many different categories, sub-categories, or types for each of the benign, suspicious, and non-benign behavior classifications. For example, a behavior that is classified as a "non-benign behavior" may be categorized as an abnormality or malware, and sub-categorized as adware, a key logger, ransomware, spyware, mobile remote access Trojan (mRAT), botnet, phishing app, Trojan, SMS fraudware, etc. Each of these different malware sub-categories/types poses a different level, degree, or type of risk or threat to the user or the computing device. Said another way, the severity of the risk/threat that a detected or potential non-benign behavior poses to a computing device depends on its malware type (e.g., adware, Trojan, etc.).

Conventional machine leaning techniques and behavior-based security solutions do not adequately identify or account for the malware type associated with a detected or potential non-benign behavior. As a result, conventional solutions do not adequately balance tradeoffs between the amount of the device's limited processing, memory, or energy resources that are used to identify, analyze or respond to a non-benign behavior and the severity of the risk/threat posed by that behavior. In addition, conventional solutions do not intelligently customize the operations of the analyzer module based on the categories, sub-categories, groups or sub-groups into which a behavior is categorized. Conventional solutions also do not intelligently select or determine the actuation operations (performed by the actuator module to heal, cure, isolate, fix or otherwise respond to identified problems) based on the categories, sub-categories, groups or sub-groups into which a behavior is categorized.

To overcome the above-described limitations of conventional solutions, an aspect computing device may be configured to use multi-label classification or meta-classification techniques to identify or determine identify the categories, subcategories, or types (e.g., game, news app, malware) that are associated with a behavior classified as benign, suspicious, or non-benign. For example, the computing device may be configured to use multi-label classification or meta-classification techniques to identify or determine the malware types (and thus risks) associated with a suspicious or non-benign behavior, to customize its analysis operations (e.g., the operations performed by the analyzer module, etc.) based on the malware types associated with a suspicious or non-benign behavior, and perform different actuation operations based on the malware types associated with a suspicious or non-benign behavior.

There are many different malware types and the severity of the risk/threat that a detected or potential non-benign behavior poses to a computing device may depend on its malware type. For example, adware is a type of malware that automatically renders advertisements on the device to generate revenue for its author. An adware application may secretly monitor the usage of the device, collect information regarding the Internet sites that the user visits, and display advertisements related to the types of goods or services featured on the visited Internet sites. Since adware applications typically do not collect or share highly confidential or personal information (e.g., photographs, contact lists, etc.), they are typically more of annoyance for the user than a security risk to the device. As such, the computing device may be configured to perform limited or lightweight analysis and/or actuation operations (i.e., to conserve its resources) when a suspicious or potentially non-benign behavior is sub-classified as adware.

Key loggers are a type of malware that monitor and log user inputs without the user's knowledge or consent. For example, a key logger may silently observe keystrokes to capture passwords, personal communications, etc.

Ransomware is a type of malware that restricts access to the computing device (e.g., by locking the device, encrypting all of its files, etc.), and demands a ransom be paid to the creator before the restriction is removed (e.g., device is unlocked, filed are decrypted, etc.). A ransomware application may pose a significant financial threat to the user.

Spyware and mRATs are types of malware that gather and send information about device or users without their knowledge or consent. For example, a spyware application may monitor a user's location and actions (by collecting information from the device's sensors), and send these values to an external server. As such, these malware types may pose a significant threat to the user's privacy.

A botnet is typically a collection of Internet-connected application programs that communicate with other similar programs on other devices to perform one or more tasks, such as maintaining control of an Internet Relay Chat (IRC) channel, sending spam email messages, participating in large scale or distributed denial-of-service (DDoS) attacks, etc. A botnet may consume a significant amount of the computing device's available resources, and poses a significant threat to the device. A botnet may pose a severe threat to the device.

Phishing is a cyber attack technique and a type of malware that attempts to fool the user to acquire sensitive information (e.g., usernames, passwords, credit card details, etc.), typically via spoofing another application/website or pretending to be a trustworthy entity. For example, a phishing app may attempt to fool the user to enter personal information into a fake website or application that is almost identical to legitimate site/application, or may contain links to websites that are infected with malware. Phishing apps may pose a moderate to significant risk to the device, especially if the user is a child, senior citizen, or unfamiliar with such cyber attack techniques.

A Trojan is a non-self-replicating type of malware that includes malicious code that, when executed, carries out actions determined by the nature of the Trojan, typically causing loss or theft of data. Typically, a Trojan pretends to be a legitimate application, but has hidden malicious functionality. For example, Trojans often acts as a backdoor, contacting other entities/devices to provide them with unauthorized access to the affected computing device. A Trojan may also consume a significant amount of the computing device's available processing, memory, and battery resources. For all these reasons, Trojans may pose a severe threat to the device.

SMS Fraudware is a type of malware that attempts to send premium SMS messages without the user's knowledge or consent. SMS Fraudware may pose a significant financial threat to the user.

As discussed above, a computing device may be configured to intelligently determine or select the analysis and/or actuation operations performed by the device based on the classification and sub-classifications (e.g., malware, adware, etc.) or determined relative importance of a behavior or software application. In various aspects, the computing device may be configured to determine the sub-classifications by using a multi-classification classifier model and/or a meta-classifier model. In an aspect, the multi-classification classifier model may include a meta-classifier model.

A multi-classification classifier model may a classifier model that supports multiple classification labels. For example, a multi-classification classifier model may include decision stumps (e.g., boosted decision stumps, etc.) that are each associated with one or more labels. Decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the condition tested by a boosted decision stump is "is the frequency of SMS transmissions less than x per minute," applying a value of "3" to the boosted decision stump will result in either a "yes" answer (for "less than 3" SMS transmissions) or a "no" answer (for "3 or more" SMS transmissions).

In addition to evaluating a condition and outputting an answer and a weight value (e.g., as part of the analysis results) for determining whether a behavior is benign or non-benign, each decision stump in a multi-classification classifier model may output an additional value (e.g., a probability value, etc.) for each of its associated labels. For example, applying a behavior vector to a multi-classification classifier model that includes the classification labels "adware," "spyware," "key-logger," "SMSFraud," and "ransomware" may cause the device to generate the following output:

[0.1, 0.9, 0.9, 0.2, 0.2]

An aspect computing device may use this output (i.e., label analysis result [0.1, 0.9, 0.9, 0.2, 0.2]) to determine that the evaluated behavior could be sub-classified as adware with 10% confidence, as spyware with 90% confidence, as key-logger with 90% confidence, as SMSFraud with 20% confidence, and as ransomeware with 20% confidence. As a result, the device may determine that the behavior could be sub-classified as spyware and key-logger with a high degree of confidence (i.e., 90% confidence). In response, the device may sub-classify the behavior into the spyware and key-logger categories (e.g., by adding or associating labels to the behavior, etc.), determine the risk, threat, or security level associated with each of these categories, and determine/select the analysis and/or actuation operations that are to be performed based on the categories or their associated risk, threat or security level.

The computing device may be configured to make such sub-classification decisions/determinations in addition to, and independent of, its classification decisions/determinations of whether the device behavior is benign, suspicious or non-benign. For example, the computing device may apply a behavior vector to a multi-classification classifier model to generate classification analysis results and label analysis results, classify the behavior as suspicious based on the classification analysis results, sub-classify the behavior into the spyware and key-logger categories based on the label analysis results, increase its level of scrutiny (e.g., by using more robust classifier models, etc.) to generate more comprehensive analysis results, and use the more comprehensive analysis results to determine whether the behavior is benign or non-benign. If the behavior is classified as non-benign, the computing device may select or determine the appropriate actuation operations (e.g., prompt user, whitelist application, terminate process, etc.) based on the sub-classifications (e.g., spyware, key-logger, etc.).

In an aspect, the computing device may be configured to determine the sub-classifications by using a meta-classifier model. A meta-classifier model may be a classifier model that includes decision nodes for testing or evaluating conditions or features suitable for determining sub-classifications for a behavior. A computing device may be configured to apply a behavior vector and the analysis results or classification output to the meta-classifier model to generate information that may be used to sub-classify a behavior into one or more categories. For example, a meta-classifier model may include decision node that evaluates a location feature, the result of which may be added to a spyware value. Similarly, the meta-classifier model may evaluate conditions related to the recording and communicating accelerometer readings, the results of which may be added to both a key-logger value and the spyware value. The meta-classifier model may also evaluate conditions for determining whether the behavior is an unknown type of malware (i.e., malware that does not fall under any of the existing or known categories).

In some aspects, the computing device may be configured to use the behavior sub-classifications to determine the risk, threat, or suspicion level associated with a behavior, and select or modify a classifier model based on the determined risk, threat, or suspicion level. For example, the computing device may apply a behavior vector to a classifier model (e.g., the initial classifier model in a family of classifier models) to generate analysis results, use the analysis results to determine the conditions or features in the classifier model that are present in the device and to sub-classify the behavior, determine the risk, threat, or suspicion level associated with the behavior based on the sub-classification, and select a subsequent classifier model in the family of classifier models based on the determined risk, threat, or suspicion level. For instance, if the behavior is sub-classified as Ransomware or spyware, the computing device may bypass the intermediate RFMs or classifier models in the family of classifier models to select a full classifier model, full feature RFM, or more robust classifier model. Alternatively, if the behavior is sub-classified as Ransomware or spyware, the computing device may select a subsequent classifier model that include decision nodes that evaluate conditions determined to have a high probability of determining whether a behavior is Ransomware or spyware.

The computing device may be configured to alter other analysis operations based on the determined risk, threat, or suspicion level. For example, the computing device may be configured to stall the application before analyzing the queued up events in the memory and/or monitor the application more closely with respect to features that are not evaluated by the classifier model, such as memory usage and the contents of the memory.

The computing device may be configured to select and perform the actuation operations based on the determined risk, threat, or suspicion level. For example, since Adware is annoying but does not present immediate danger, after determining that a software application is Adware, the computing device could allow the application to continue to run/operate on the device, and prompt to user with a shortcut to uninstall the app. The computing device could immediately remove ransomware without displaying the ransom message (fake message example: "FBI has locked your phone, all activity of this phone has been recorded . . . "). That is, after determining that a software application is ransomware, the computing device may terminate the application and its message, inform the user that the message is fake or malicious and there is no need to worry, and recommend to the user that the application should be uninstalled. Similarly, the computing device could be configured to immediately inform the user of spyware such as mRATs.

The various aspects may be implemented on a number of single processor and multiprocessor computer systems, including a system-on-chip (SOC). FIG. 1 illustrates an example system-on-chip (SOC) 100 architecture that may be used in computing devices implementing the various aspects. The SOC 100 may include a number of heterogeneous processors, such as a digital signal processor (DSP)

103, a modem processor 104, a graphics processor 106, and an application processor 108. The SOC 100 may also include one or more coprocessors 110 (e.g., vector coprocessor) connected to one or more of the heterogeneous processors 103, 104, 106, 108. Each processor 103, 104, 106, 108, 110 may include one or more cores, and each processor/core may perform operations independent of the other processors/cores. For example, the SOC 100 may include a processor that executes a first type of operating system (e.g., FreeBSD, LINUX, OS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio and video signals for rendering in a web browser. The SOC 100 may further include system components and resources 116, such as voltage regulators, oscillators, phase-locked loops, peripheral bridges, data controllers, memory controllers, system controllers, access ports, timers, and other similar components used to support the processors and software clients (e.g., a web browser) running on a computing device.

The system components and resources 116 and/or custom circuitry 114 may include circuitry to interface with peripheral devices, such as cameras, electronic displays, wireless communication devices, external memory chips, etc. The processors 103, 104, 106, 108 may be interconnected to one or more memory elements 112, system components and resources 116, and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., a DSP 103, a modem processor 104, a graphics processor 106, an applications processor 108, etc.).

In an aspect, the SOC 100 may be included in a mobile device 102, such as a smartphone. The mobile device 102 may include communication links for communication with a telephone network, the Internet, and/or a network server. Communication between the mobile device 102 and the network server may be achieved through the telephone network, the Internet, private network, or any combination thereof.

In various aspects, the SOC 100 may be configured to collect behavioral, state, classification, modeling, success rate, and/or statistical information in the mobile device, and send the collected information to the network server (e.g., via the telephone network) for analysis. The network server may use information received from the mobile device to generate, update or refine classifiers or data/behavior models that are suitable for use by the SOC 100 when identifying and/or classifying performance-degrading mobile device behaviors. The network server may send data/behavior models to the SOC 100, which may receive and use data/behavior models to identify suspicious or performance-degrading mobile device behaviors, software applications, processes, etc.

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components (e.g., accelerometer, etc.) of modern electronic devices.

In addition to the mobile device 102 and SOC 100 discussed above, the various aspects may be implemented in a wide variety of computing systems, which may include a single processor, multiple processors, multicore processors, or any combination thereof.

Figure 2:
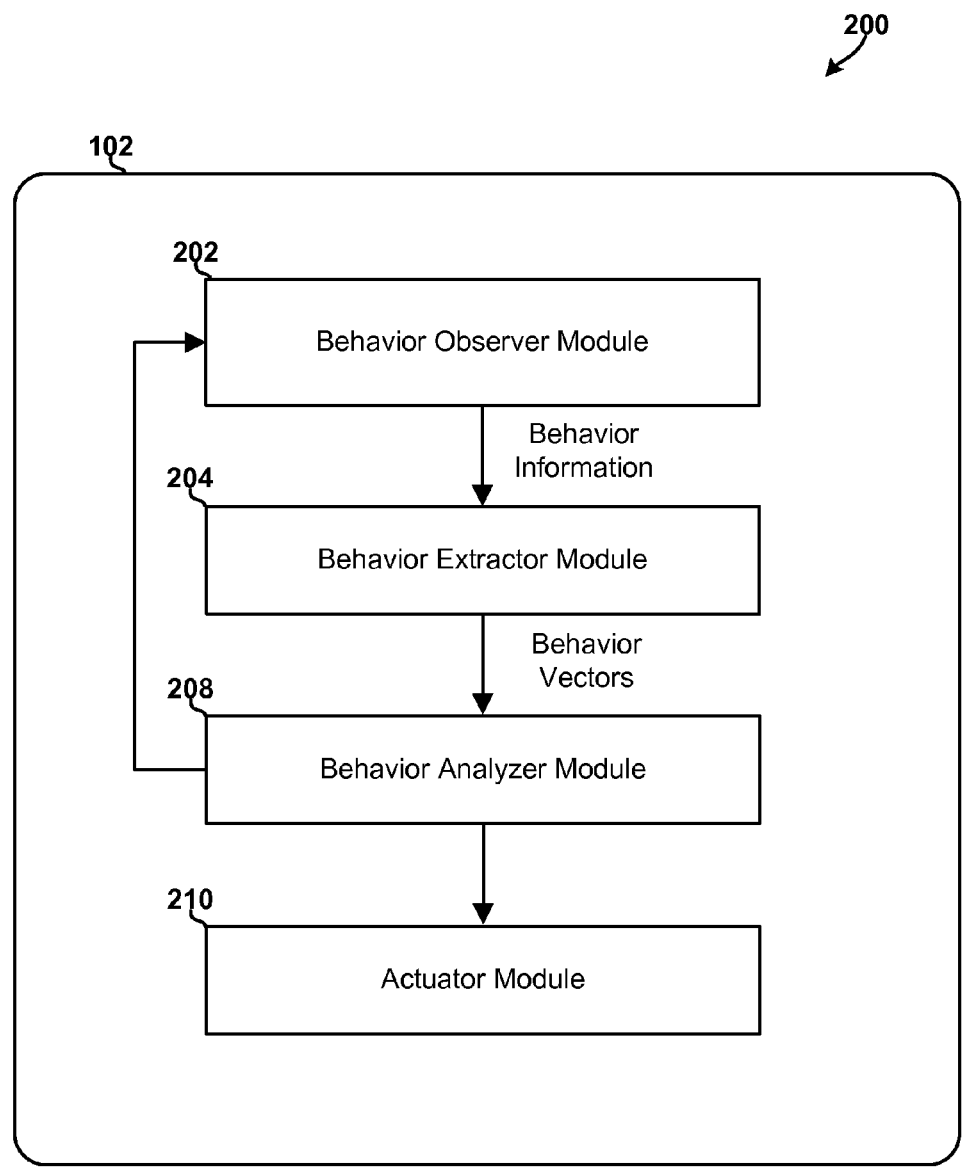
FIG. 2 is a block diagram illustrating example logical components and information flows in an aspect mobile device configured to classify and sub-classify behaviors in accordance with the various aspects.

FIG. 2 illustrates example logical components and information flows in an aspect mobile computing device 102 that includes a behavior-based security system 200 configured to use behavioral analysis techniques to identify and respond to non-benign device behaviors. In the example illustrated in FIG. 2, the computing device is a mobile computing device 102 that includes a device processor (i.e., mobile device processor) configured with executable instruction modules that include a behavior observer module 202, a behavior extractor module 204, a behavior analyzer module 208, and an actuator module 210. Each of the modules 202-210 may be a thread, process, daemon, module, sub-system, or component that is implemented in software, hardware, or a combination thereof. In various aspects, the modules 202-210 may be implemented within parts of the operating system (e.g., within the kernel, in the kernel space, in the user space, etc.), within separate programs or applications, in specialized hardware buffers or processors, or any combination thereof. In an aspect, one or more of the modules 202-210 may be implemented as software instructions executing on one or more processors of the mobile computing device 102.

The behavior observer module 202 may be configured to instrument application programming interfaces (APIs), counters, hardware monitors, etc. at various levels/modules of the device, and monitor the activities, conditions, operations, and events (e.g., system events, state changes, etc.) at the various levels/modules over a period of time. For example, the behavior observer module 202 may be configured to monitor various software and hardware components of the mobile computing device 102, and collect behavior information pertaining to the interactions, communications, transactions, events, or operations of the monitored and measurable components that are associated with the activities of the mobile computing device 102. Such activities include a software application's use of a hardware component, performance of an operation or task, a software application's execution in a processing core of the mobile computing device 102, the execution of process, the performance of a task or operation, a device behavior, etc.

As a further example, the behavior observer module 202 may be configured to monitor the activities of the mobile computing device 102 by monitoring the allocation or use of device memory by the software applications. In an aspect, this may be accomplished by monitoring the operations of a memory management system (e.g., a virtual memory manager, memory management unit, etc.) of the computing device. Such systems are generally responsible for managing the allocation and use of system memory by the various application programs to ensure that the memory used by one process does not interfere with memory already in use by another process. Therefore, by monitoring the operations of the memory management system, the device processor may collect behavior information that is suitable for use in determining whether to two applications are working in concert, such as whether two processes have been allocated the same memory space, are reading and writing information to the same memory address or location, or are performing other suspicious memory-related operations.

The behavior observer module 202 may collect behavior information pertaining to the monitored activities, conditions, operations, or events, and store the collected information in a memory (e.g., in a log file, etc.). The behavior observer module 202 may then communicate (e.g., via a memory write operation, function call, etc.) the collected behavior information to the behavior extractor module 204.

In an aspect, the behavior observer module 202 may be configured to monitor the activities of the mobile computing device 102 by monitoring the allocation or use of device memory at the hardware level and/or based on hardware events (e.g., memory read and write operations, etc.). In a further aspect, the behavior observer module 202 may be implemented in a hardware module (e.g., the memory monitoring unit 113 described above with reference to FIG. 1) for faster, near-real time execution of the monitoring functions. For example, the behavior observer module 202 may be implemented within a hardware module that includes a programmable logic circuit (PLC) in which the programmable logic elements are configured to monitor the allocation or use of computing device memory at the hardware level and/or based on hardware events (e.g., memory read and write operations, etc.) and otherwise implement the various aspects. Such a hardware module may output results of hardware event monitoring to the device processor implementing the behavior extractor module 204. A PLC may be configured to monitor certain hardware and implement certain operations of the various aspects described herein using PLC programming methods that are well known. Other circuits for implementing some operation of the aspect methods in a hardware module may also be used.

Similarly, each of the modules 202-210 may be implemented in hardware modules, such as by including one or PLC elements in a SoC with the PLC element(s) configured using PLC programming methods to perform some operation of the aspect methods.

The behavior extractor module 204 may be configured to receive or retrieve the collected behavior information, and use this information to generate one or more behavior vectors. In the various aspects, the behavior extractor module 204 may be configured to generate the behavior vectors to include a concise definition of the observed behaviors, relationships, or interactions of the software applications. For example, each behavior vector may succinctly describe the collective behavior of the software applications in a value or vector data-structure. The vector data-structure may include series of numbers, each of which signifies a feature or a behavior of the device, such as whether a camera of the computing device is in use (e.g., as zero or one), how much network traffic has been transmitted from or generated by the computing device (e.g., 20 KB/sec, etc.), how many internet messages have been communicated (e.g., number of SMS messages, etc.), and/or any other behavior information collected by the behavior observer module 202. In an aspect, the behavior extractor module 204 may be configured to generate the behavior vectors so that they function as an identifier that enables the computing device system (e.g., the behavior analyzer module 208) to quickly recognize, identify, or analyze the relationships between applications.

The behavior analyzer module 208 may be configured to apply the behavior vectors to classifier modules to identify the nature of the relationship between two or more software applications. The behavior analyzer module 208 may also be configured to apply the behavior vectors to classifier modules to determine whether a collective device behavior (i.e., the collective activities of two or more software applications operating on the device) is a non-benign behavior that is contributing to (or is likely to contribute to) the device's degradation over time and/or which may otherwise cause problems on the device.

The behavior analyzer module 208 may notify the actuator module 210 that an activity or behavior is not benign. In response, the actuator module 210 may perform various actions or operations to heal, cure, isolate, or otherwise fix identified problems. For example, the actuator module 210 may be configured to stop or terminate one or more of the software applications when the result of applying the behavior vector to the classifier model (e.g., by the analyzer module) indicates that the collective behavior of the software applications not benign.

In various aspects, the behavior observer module 202 may be configured to monitor the activities of the mobile computing device 102 by collecting information pertaining to library application programming interface (API) calls in an application framework or run-time libraries, system call APIs, file-system and networking sub-system operations, device (including sensor devices) state changes, and other similar events. In addition, the behavior observer module 202 may monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor the activities of the mobile computing device 102 by monitoring data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the activities of the mobile computing device 102 by monitoring the system resource usage, which may include monitoring the number of forks, memory access operations, number of files open, etc. The behavior observer module 202 may monitor the state of the mobile computing device 102, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor the activities of the mobile computing device 102 by monitoring driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device 102.

The behavior observer module 202 may also monitor the activities of the mobile computing device 102 by monitoring one or more hardware counters that denote the state or status of the mobile computing device 102 and/or computing device sub-systems. A hardware counter may include a special-purpose register of the processors/cores that is configured to store a count value or state of hardware-related activities or events occurring in the mobile computing device 102.

The behavior observer module 202 may also monitor the activities of the mobile computing device 102 by monitoring the actions or operations of software applications, software downloads from an application download server (e.g., Apple® App Store server), computing device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may also monitor the activities of the mobile computing device 102 by monitoring transmissions or communications of the mobile computing device 102, including communications that include voicemail (VoiceMailComm), device identifiers (DeviceID-Comm), user account information (UserAccountComm), calendar information (CalendarComm), location information (LocationComm), recorded audio information (RecordAudioComm), accelerometer information (AccelerometerComm), etc.

The behavior observer module 202 may also monitor the activities of the mobile computing device 102 by monitoring the usage of, and updates/changes to, compass information, computing device settings, battery life, gyroscope information, pressure sensors, magnet sensors, screen activity, etc. The behavior observer module 202 may monitor notifications communicated to and from a software application (AppNotifications), application updates, etc. The behavior observer module 202 may monitor conditions or events pertaining to a first software application requesting the downloading and/or install of a second software application. The behavior observer module 202 may monitor conditions or events pertaining to user verification, such as the entry of a password, etc.

The behavior observer module 202 may also monitor the activities of the mobile computing device 102 by monitoring conditions or events at multiple levels of the mobile computing device 102, including the application level, radio level, and sensor level. Application level observations may include observing the user via facial recognition software, observing social streams, observing notes entered by the user, observing events pertaining to the use of PassBook®, Google® Wallet, Paypal®, and other similar applications or services. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of user interaction with the mobile computing device 102 before establishing radio communication links or transmitting information, dual/multiple subscriber identification module (SIM) cards, Internet radio, mobile phone tethering, offloading data for computations, device state communications, the use as a game controller or home controller, vehicle communications, computing device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile computing device 102. For example, the computing device processor may be configured to determine whether the device is in a holster (e.g., via a magnet sensor configured to sense a magnet within the holster) or in the user's pocket (e.g., via the amount of light detected by a camera or light sensor). Detecting that the mobile computing device 102 is in a holster may be relevant to recognizing suspicious behaviors, for example, because activities and functions related to active usage by a user (e.g., taking photographs or videos, sending messages, conducting a voice call, recording sounds, etc.) occurring while the mobile computing device 102 is holstered could be signs of nefarious processes executing on the device (e.g., to track or spy on the user).

Other examples of sensor level observations related to usage or external environments may include, detecting near-field communication (NFC) signaling, collecting information from a credit card scanner, barcode scanner, or mobile tag reader, detecting the presence of a Universal Serial Bus (USB) power charging source, detecting that a keyboard or auxiliary device has been coupled to the mobile computing device 102, detecting that the mobile computing device 102 has been coupled to another computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile computing device 102 is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile computing device 102, etc.

To reduce the number of factors monitored to a manageable level, in an aspect, the behavior observer module 202 may be configured to perform coarse observations by monitoring/observing an initial set of behaviors or factors that are a small subset of all factors that could contribute to the computing device's degradation. In an aspect, the behavior observer module 202 may receive the initial set of behaviors and/or factors from a server and/or a component in a cloud service or network. In an aspect, the initial set of behaviors/factors may be specified in machine learning classifier models.

Each classifier model may be a behavior model that includes data and/or information structures (e.g., feature vectors, behavior vectors, component lists, etc.) that may be used by a computing device processor to evaluate a specific feature or aspect of a computing device's behavior. Each classifier model may also include decision criteria for monitoring a number of features, factors, data points, entries, APIs, states, conditions, behaviors, applications, processes, operations, components, etc. (herein collectively "features") in the computing device. The classifier models may be preinstalled on the computing device, downloaded or received from a network server, generated in the computing device, or any combination thereof. The classifier models may be generated by using crowd sourcing solutions, behavior modeling techniques, machine learning algorithms, etc.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes/tests only the features/entries that are most relevant for determining whether a particular activity is an ongoing critical activity and/or whether a particular computing device behavior is not benign. As an example, a device processor may be may be configured to receive a full classifier model from a network server, generate a lean classifier model in the computing device based on the full classifier, and use the locally generated lean classifier model to classify a behavior of the device as being either benign or non-benign (i.e., malicious, performance degrading, etc.).

A locally generated lean classifier model is a lean classifier model that is generated in the computing device. That is, since modern computing devices (e.g., mobile devices, etc.) are highly configurable and complex systems, the features that are most important for determining whether a particular device behavior is non-benign (e.g., malicious or performance-degrading) may be different in each device. Further, a different combination of features may require monitoring and/or analysis in each device in order for that device to quickly and efficiently determine whether a particular behavior is non-benign. Yet, the precise combination of features that require monitoring and analysis, and the relative priority or importance of each feature or feature combination, can often only be determined using information obtained from the specific device in which the behavior is to be monitored or analyzed. For these and other reasons, various aspects may generate classifier models in the computing device in which the models are used. These local classifier models allow the device processor to accurately identify the specific features that are most important in determining whether a behavior on that specific device is non-benign (e.g., contributing to that device's degradation in performance). The local classifier models also allow the device processor to prioritize the features that are tested or evaluated in accordance with their relative importance to classifying a behavior in that specific device.

A device-specific classifier model is a classifier model that includes a focused data model that includes/tests only computing device-specific features/entries that are determined to be most relevant to classifying an activity or behavior in a specific computing device. An application-specific classifier model is a classifier model that includes a focused data model that includes/tests only the features/entries that are most relevant for evaluating a particular software application. By dynamically generating application-specific classifier models locally in the computing device, the various aspects allow the device processor to focus its monitoring and analysis operations on a small number of features that are most important for determining whether the operations of a specific software application are contributing to an undesirable or performance degrading behavior of that device.

A multi-application classifier model may be a local classifier model that includes a focused data model that includes or prioritizes tests on the features/entries that are most relevant for determining whether the collective behavior of two or more specific software applications (or specific types of software applications) is non-benign. A multi-application classifier model may include an aggregated feature set and/or decision nodes that test/evaluate an aggregated set of features. The device processor may be configured to generate a multi-application classifier model by identifying the device features that are most relevant for identifying the relationships, interactions, and/or communications between two or more software applications operating on the computing device, identifying the test conditions that evaluate one of identified device features, determining the priority, importance, or success rates of the identified test conditions, prioritizing or ordering the identified test conditions in accordance with their importance or success rates, and generating the classifier model to include the identified test conditions so that they are ordered in accordance with their determined priorities, importance, or success rates. The device processor may also be configured to generate a multi-application classifier model by combining two or more application-specific classifier models.

In various aspects, the device processor may be configured to generate a multi-application classifier model in response to determine that two or more applications are colluding or working in concert or that applications should be analyzed together as a group. The device processor may be configured to generate a multi-application classifier model for each identified group or class of applications. However, analyzing every group may consume a significant amount of the device's limited resources. Therefore, in an aspect, the device processor may be configured to determine the probability that an application is engaged in a collusive behavior (e.g., based on its interactions with the other applications, etc.), and intelligently generate the classifier models for only the groups that include software applications for which there is a high probability of collusive behavior.

The behavior analyzer module 208 may be configured to apply the behavior vectors generated by the behavior extractor module 204 to a classifier model to determine whether a monitored activity (or behavior) is benign or non-benign. In an aspect, the behavior analyzer module 208 may classify a behavior as "suspicious" when the results of its behavioral analysis operations do not provide sufficient information to classify the behavior as either benign or non-benign.

The behavior analyzer module 208 may be configured to notify the behavior observer module 202 in response to identifying the colluding software applications, determining that certain applications should be evaluated as a group, and/or in response to determining that a monitored activity or behavior is suspicious. In response, the behavior observer module 202 may adjust the granularity of its observations (i.e., the level of detail at which computing device features are monitored) and/or change the applications/factors/behaviors that are monitored based on information received from the behavior analyzer module 208 (e.g., results of the real-time analysis operations), generate or collect new or additional behavior information, and send the new/additional information to the behavior analyzer module 208 for further analysis/classification.

Such feedback communications between the behavior observer module 202 and the behavior analyzer module 208 enable the mobile computing device 102 to recursively increase the granularity of the observations (i.e., make finer or more detailed observations) or change the features/behaviors that are observed until a collective behavior is classified as benign or non-benign, a source of a suspicious or performance-degrading behavior is identified, until a processing or battery consumption threshold is reached, or until the device processor determines that the source of the suspicious or performance-degrading device behavior cannot be identified from further changes, adjustments, or increases in observation granularity. Such feedback communication also enable the mobile computing device 102 to adjust or modify the behavior vectors and classifier models without consuming an excessive amount of the computing device's processing, memory, or energy resources.

The behavior observer module 202 and the behavior analyzer module 208 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. This allows the mobile computing device 102 to efficiently identify and prevent problems without requiring a large amount of processor, memory, or battery resources on the device.

In various aspects, the device processor of the mobile computing device 102 may be configured to identify a critical data resource that requires close monitoring, monitor (e.g., via the behavior observer module 202) API calls made by software applications when accessing the critical data resource, identify a pattern of API calls as being indicative of non-benign behavior by two or more software applications, generate a behavior vector based on the identified pattern of API calls and resource usage, use the behavior vector to perform behavior analysis operations (e.g., via the behavior analyzer module 208), and determine whether one or more of the software application is non-benign based on the behavior analysis operations.

In an aspect, the device processor may be configured to identify APIs that are used most frequently by software applications operating on the computing device, store information regarding usage of identified hot APIs in an API log in a memory of the device, and perform behavior analysis operations based on the information stored in the API log to identify a non-benign behavior.

In the various aspects, the mobile computing device 102 may be configured to work in conjunction with a network server to intelligently and efficiently identify the features, factors, and data points that are most relevant to determining whether an activity or behavior is non-benign. For example, the device processor may be configured to receive a full classifier model from the network server, and use the received full classifier model to generate lean classifier models (i.e., data/behavior models) that are specific for the features and functionalities of the computing device or the software applications operating on the device. The device processor may use the full classifier model to generate a family of lean classifier models of varying levels of complexity (or "leanness"). The leanest family of lean classifier models (i.e., the lean classifier model based on the fewest number of test conditions) may be applied routinely until a behavior is encountered that the model cannot categorize as either benign or not benign (and therefore is categorized by the model as suspicious), at which time a more robust (i.e., less lean) lean classifier model may be applied in an attempt to categorize the behavior. The application of ever more robust lean classifier models within the family of generated lean classifier models may be applied until a definitive classification of the behavior is achieved. In this manner, the device processor can strike a balance between efficiency and accuracy by limiting the use of the most complete, but resource-intensive lean classifier models to those situations where a robust classifier model is needed to definitively classify a behavior.

In various aspects, the device processor may be configured to generate lean classifier models by converting a finite state machine representation/expression included in a full classifier model into boosted decision stumps. The device processor may prune or cull the full set of boosted decision stumps based on device-specific features, conditions, or configurations to generate a classifier model that includes a subset of boosted decision stumps included in the full classifier model. The device processor may then use the lean classifier model to intelligently monitor, analyze and/or classify a computing device behavior.

Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions).

Boosted decision stumps are efficient because they are very simple and primal (and thus do not require significant processing resources). Boosted decision stumps are also very parallelizable, and thus many stumps may be applied or tested in parallel/at the same time (e.g., by multiple cores or processors in the computing device).

In an aspect, the device processor may be configured to generate a lean classifier model that includes a subset of classifier criteria included in the full classifier model and only those classifier criteria corresponding to the features relevant to the computing device configuration, functionality, and connected/included hardware. The device processor may use this lean classifier model(s) to monitor only those features and functions present or relevant to the device. The device processor may then periodically modify or regenerate the lean classifier model(s) to include or remove various features and corresponding classifier criteria based on the computing device's current state and configuration.

As an example, the device processor may be configured to receive a large boosted-decision-stumps classifier model that includes decision stumps associated with a full feature set of behavior models (e.g., classifiers), and derive one or more lean classifier models from the large classifier models by selecting only features from the large classifier model(s) that are relevant the computing device's current configuration, functionality, operating state and/or connected/included hardware, and including in the lean classifier model a subset of boosted decision stumps that correspond to the selected features. In this aspect, the classifier criteria corresponding to features relevant to the computing device may be those boosted decision stumps included in the large classifier model that test at least one of the selected features. The device processor may then periodically modify or regenerate the boosted decision stumps lean classifier model(s) to include or remove various features based on the computing device's current state and configuration so that the lean classifier model continues to include application-specific or device-specific feature boosted decision stumps.

In addition, the device processor may also dynamically generate application-specific classifier models that identify conditions or features that are relevant to specific software applications (Google® wallet and eTrade®) and/or to a specific type of software application (e.g., games, navigation, financial, news, productivity, etc.). These classifier models may be generated to include a reduced and more focused subset of the decision nodes that are included in the full classifier model (or of those included in a leaner classifier model generated from the received full classifier model). These classifier models may be combined to generate multi-application classifier models.

In various aspects, the device processor may be configured to generate application-based classifier models for each software application in the system and/or for each type of software application in the system. The device processor may also be configured to dynamically identify the software applications and/or application types that are a high risk or susceptible to abuse (e.g., financial applications, point-of-sale applications, biometric sensor applications, etc.), and generate application-based classifier models for only the software applications and/or application types that are identified as being high risk or susceptible to abuse. In various aspects, device processor may be configured to generate the application-based classifier models dynamically, reactively, proactively, and/or every time a new application is installed or updated.

Each software application generally performs a number of tasks or activities on the computing device. The specific execution state in which certain tasks/activities are performed in the computing device may be a strong indicator of whether a behavior or activity merits additional or closer scrutiny, monitoring and/or analysis. As such, in the various aspects, the device processor may be configured to use information identifying the actual execution states in which certain tasks/activities are performed to focus its behavioral monitoring and analysis operations, and better determine whether an activity is a critical activity and/or whether the activity is non-benign.

In various aspects, the device processor may be configured to associate the activities/tasks performed by a software application with the execution states in which those activities/tasks were performed. For example, the device processor may be configured to generate a behavior vector that includes the behavior information collected from monitoring the instrumented components in a sub-vector or data-structure that lists the features, activities, or operations of the software for which the execution state is relevant (e.g., location access, SMS read operations, sensor access, etc.). In an aspect, this sub-vector/data-structure may be stored in association with a shadow feature value sub-vector/data-structure that identifies the execution state in which each feature/activity/operation was observed. As an example, the device processor may generate a behavior vector that includes a "location_background" data field whose value identifies the number or rate that the software application accessed location information when it was operating in a background state. This allows the device processor to analyze this execution state information independent of and/or in parallel with the other observed/monitored activities of the computing device. Generating the behavior vector in this manner also allows the system to aggregate information (e.g., frequency or rate) over time.

In various aspects, the device processor may be configured to generate the behavior vectors to include information that may be input to a decision node in the machine learning classifier to generate an answer to a query regarding the monitored activity.

In various aspects, the device processor may be configured to generate the behavior vectors to include execution information. The execution information may be included in the behavior vector as part of a behavior (e.g., camera used 5 times in 3 second by a background process, camera used 3 times in 3 second by a foreground process, etc.) or as part of an independent feature. In an aspect, the execution state information may be included in the behavior vector as a shadow feature value sub-vector or data structure. In an aspect, the behavior vector may store the shadow feature value sub-vector/data structure in association with the features, activities, tasks for which the execution state is relevant.

Figure 3A:
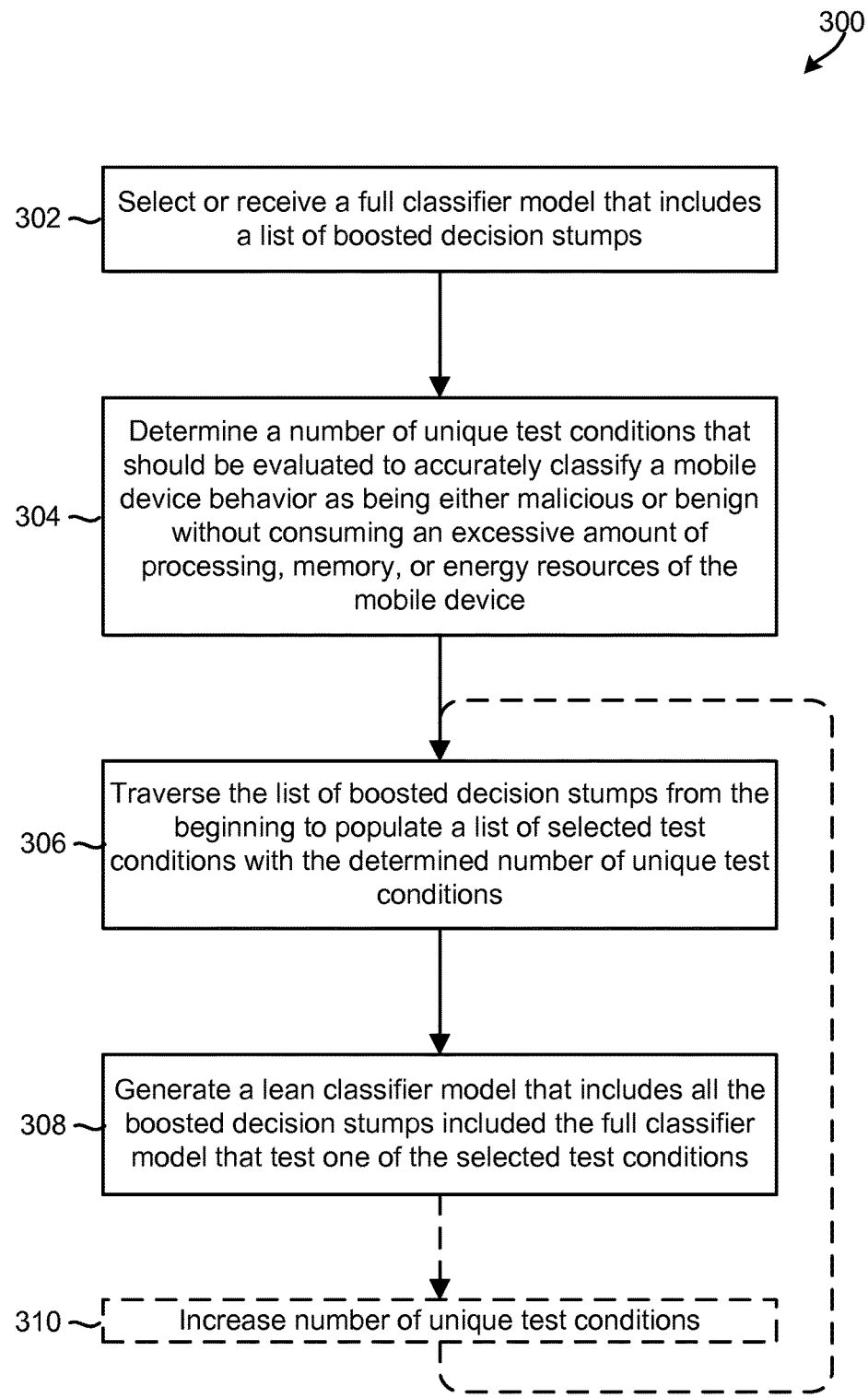
FIG. 3A is a process flow diagram illustrating a method of generating a lean classifier model that includes a subset of the features and data points included in a full classifier model in accordance with an aspect.

FIG. 3A illustrates a method 300 of generating a lean or focused classifier/behavior model in the computing device. Method 300 may be performed by a processor or processing core in a resource constrained computing device, such as a mobile device. In block 302 of method 300, the processing core may select or receive a full classifier model that is or includes a finite state machine, a list of boosted decision stumps or other similar information structure. In an aspect, the full classifier model includes a finite state machine that includes information suitable for expressing plurality of boosted decision stumps and/or which include information that is suitable for conversion by the computing device into a plurality of boosted decision stumps. In an aspect, the finite state machine may be (or may include) an ordered or prioritized list of boosted decision stumps. Each of the boosted decision stumps may include a test condition and a weight value.

As discussed above, boosted decision stumps are one level decision trees that have exactly one node (and thus one test question or test condition) and a weight value, and thus are well suited for use in a binary classification of data/behaviors. This means that applying a feature vector or behavior vector to boosted decision stump results in binary answers (e.g., Yes or No). For example, if the question/condition tested by a boosted decision stump is "is the frequency of SMS transmissions less than x per min," applying a value of "3" to the boosted decision stump will result in either a "yes" answer (for "less than 3" SMS transmissions) or a "no" answer (for "3 or more" SMS transmissions).

Returning to FIG. 3A, in block 304 of method 300, the processing core may determine the number unique test conditions that should be evaluated to accurately classify a computing device behavior as being either benign or non-benign without consuming an excessive amount of processing, memory, or energy resources of the computing device. This may include determining an amount of processing, memory, and/or energy resources available in the computing device, the amount processing, memory, or energy resources of the computing device that are required to test a condition, determining a priority and/or a complexity associated with a behavior or condition that is to be analyzed or evaluated in the computing device by testing the condition, and selecting/determining the number of unique test conditions so as to strike a balance or tradeoff between the consumption of available processing, memory, or energy resources of the computing device, the accuracy of the behavior classification that is to be achieved from testing the condition, and the importance or priority of the behavior that is tested by the condition.

In block 306, the processing core may traverse the list of boosted decision stumps from the beginning to populate a list of selected test conditions with the determined number of unique test conditions. In an aspect, the processing core may also determine an absolute or relative priority value for each of the selected test conditions, and store the absolute or relative priorities value in association with their corresponding test conditions in the list of selected test conditions.

In block 308, the processing core may generate a lean classifier model that includes all the boosted decision stumps included in the full classifier model that test one of the selected test conditions. In an aspect, the processing core may generate the lean classifier model to include or express the boosted decision stumps in order of importance or priority value.

In optional block 310, the number of unique test conditions may be increased in order to generate another more robust (i.e., less lean) lean classifier model by repeating the operations of traversing the list of boosted decision stumps for a larger number test conditions in block 306 and generating another lean classifier model in block 308. These operations may be repeated to generate a family of lean classifier models.

Figure 3B:
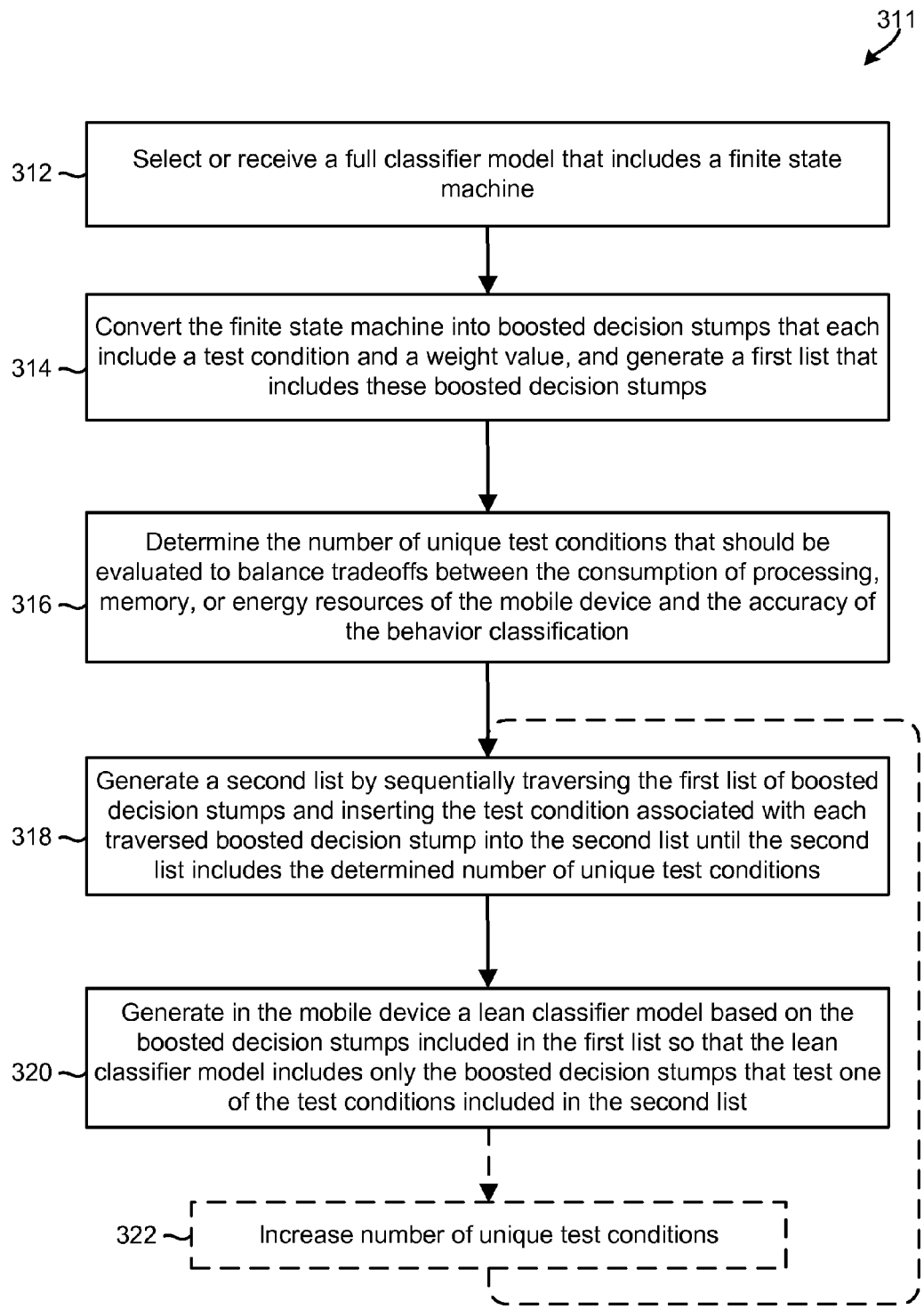
FIG. 3B is a process flow diagram illustrating another method of generating a lean classifier model locally in the computing device in accordance with another aspect.

FIG. 3B illustrates another aspect method 311 of generating data models in the computing device. Method 311 may be performed by a processing core in a computing device. In block 312 of method 311, the processing core may receive a full classifier model that includes a finite state machine. The finite state machine may be an information structure that includes information that is suitable for conversion into a plurality of boosted decision stumps. In block 314, the processing core may convert the finite state machine included in the full classifier model into boosted decision stumps that include a test condition and a weight value.

In an aspect, the processing core may also compute or determine priority values for each of the boosted decision stumps that are generated from the finite state machine in block 312. The processing core may determine the priorities of the boosted decision stumps so as to balance tradeoffs between the consumption of processing, memory, or energy resources of the computing device, the accuracy of the behavior classification, etc. The processing core may also determine the priorities of the boosted decision stumps based on their associated weight values, relative or predicted importance of the test conditions to accurately classify a behavior, etc.

Also in block 312, the processing core may generate a first list (or other information structure) that includes, references, identifies, and/or organizes the boosted decision stumps generated from the finite state machine in accordance with their priorities and/or in order of their importance. For example, the processing core may generate the first list to be an ordered list that includes the stump having the highest priority as the first item, followed by the stump having the second highest priority value, and so on. This order of importance may also take into account the information gathered from the cloud corpus, as well as information specific to the device on which the culling algorithm is being executed.

In block 316, the processing core may compute or determine the number of unique test conditions (i.e., the computing device states, features, behaviors, or conditions that may be tested in boosted decision stumps) that should be evaluated when applying the lean classifier model. Computing or determining this number of unique test conditions may involve striking a balance or tradeoff between the consumption of processing, memory, or energy resources of the computing device required to apply the model, and the accuracy of the behavior classification that is to be achieved the lean classifier model. Such a determination may include determining an amount of processing, memory, and/or energy resources available in the computing device, determining a priority and/or a complexity associated with the behavior that is to be analyzed, and balancing the available resources with the priority and/or complexity of the behavior.

In block 318, the processing core may generate a second list by sequentially traversing the first list of boosted decision stumps and inserting the test condition values associated with each traversed boosted decision stump into the second list. The processing core may continue to traverse the first list and insert values into the second list until the length of second list is equal to the determined number of unique test conditions or until the second list includes all the determined number of unique test conditions.

In block 320, the processing core may generate a lean classifier model based on the boosted decision stumps included in the first list. In an aspect, the processing core may generate the lean classifier model to include only the boosted decision stumps that test one of the test conditions included in the second list (i.e., the list of test conditions generated in block 318).

In optional block 322, the number of unique test conditions may be increased in order to generate another more robust (i.e., less lean) lean classifier model by repeating the operations of traversing the list of boosted decision stumps for a larger number test conditions in block 318 and generating another lean classifier model in block 320. These operations may be repeated to generate a family of lean classifier models.

Figure 3C:
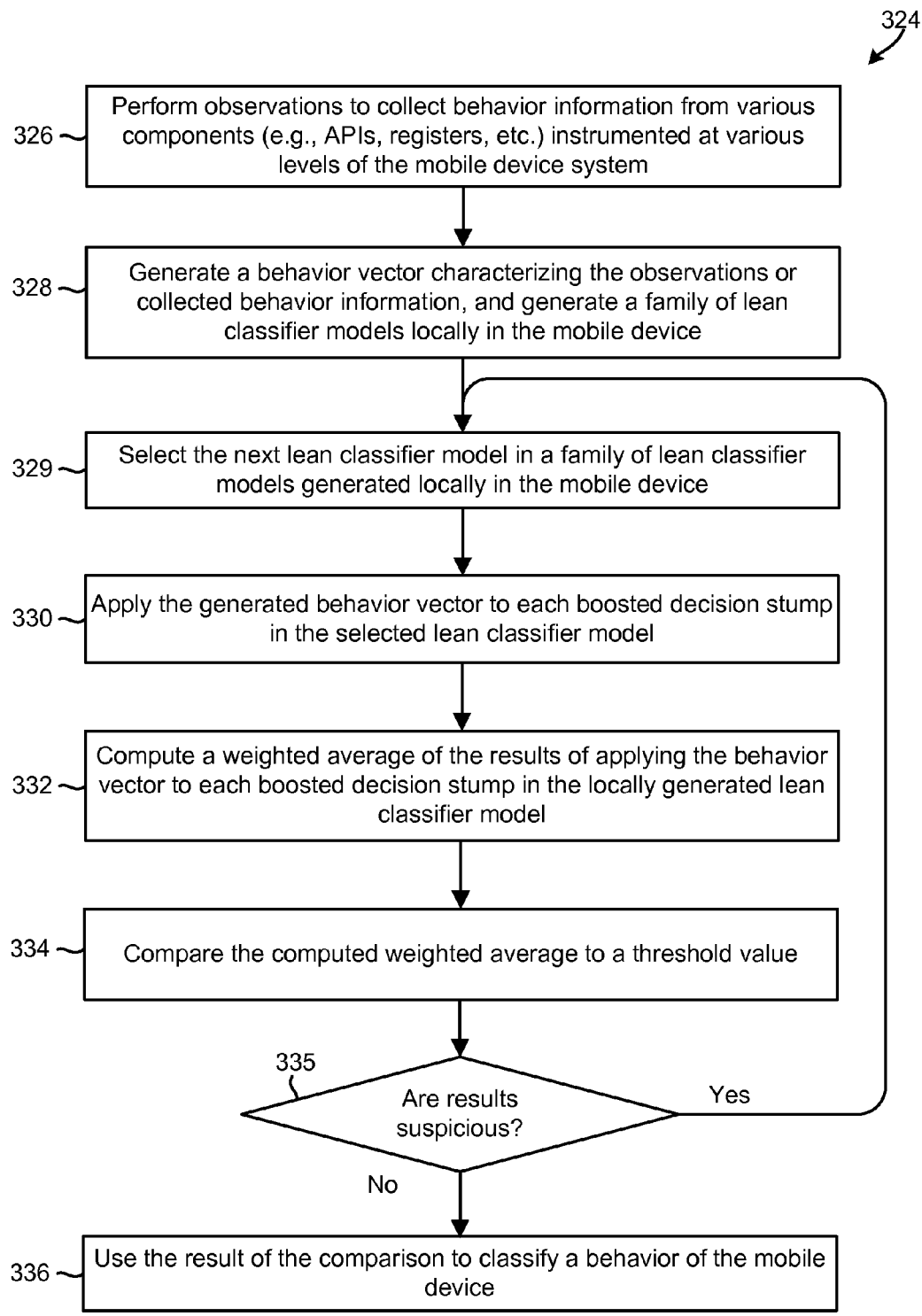
FIG. 3C is a process flow diagram illustrating an aspect method of using a locally generated lean classifier model to classify a behavior of the computing device in accordance with an aspect.

FIG. 3C illustrates an aspect method 324 of using a lean classifier model to classify a behavior of the computing device. Method 324 may be performed by a processing core in a computing device.

In block 326 of method 324, the processing core my perform observations to collect behavior information from various components that are instrumented at various levels of the computing device system. In an aspect, this may be accomplished via the behavior observer module 202 discussed above with reference to FIG. 2. In block 328, the processing core may generate a behavior vector characterizing the observations, the collected behavior information, and/or a computing device behavior. Also in block 328, the processing core may use a full classifier model to generate a lean classifier model or a family of lean classifier models of varying levels of complexity (or "leanness"). To accomplish this, the processing core may cull a family of boosted decision stumps included in the full classifier model to generate lean classifier models that include a reduced number of boosted decision stumps and/or evaluate a limited number of test conditions.

In block 329, the processing core may select the leanest classifier in the family of lean classifier models (i.e., the model based on the fewest number of different computing device states, features, behaviors, or conditions) that has not yet been evaluated or applied by the computing device. In an aspect, this may be accomplished by the processing core selecting the first classifier model in an ordered list of classifier models.

In block 330, the processing core may apply collected behavior information or behavior vectors to each boosted decision stump in the selected lean classifier model. Because boosted decision stumps are binary decisions and the lean classifier model is generated by selecting many binary decisions that are based on the same test condition, the process of applying a behavior vector to the boosted decision stumps in the lean classifier model may be performed in a parallel operation. Alternatively, the behavior vector applied in block 330 may be truncated or filtered to just include the limited number of test condition parameters included in the lean classifier model, thereby further reducing the computational effort in applying the model.

In block 332, the processing core may compute or determine a weighted average of the results of applying the collected behavior information to each boosted decision stump in the lean classifier model. In block 334, the processing core may compare the computed weighted average to a threshold value. In determination block 335, the processing core may determine whether the results of this comparison and/or the results generated by applying the selected lean classifier model are suspicious. For example, the processing core may determine whether these results may be used to classify a behavior as either benign or non-benign with a high degree of confidence, and if not treat the behavior as suspicious.

If the processing core determines that the results are suspicious (e.g., determination block 335="Yes"), the processing core may repeat the operations in blocks 329-334 to select and apply a stronger (i.e., less lean) classifier model that evaluates more device states, features, behaviors, or conditions until the behavior is classified as benign or non-benign with a high degree of confidence. If the processing core determines that the results are not suspicious (e.g., determination block 335="No"), such as by determining that the behavior can be classified as either benign or non-benign with a high degree of confidence, in block 336, the processing core may use the result of the comparison generated in block 334 to classify a behavior of the computing device as benign or potentially non-benign.

Figure 3D:
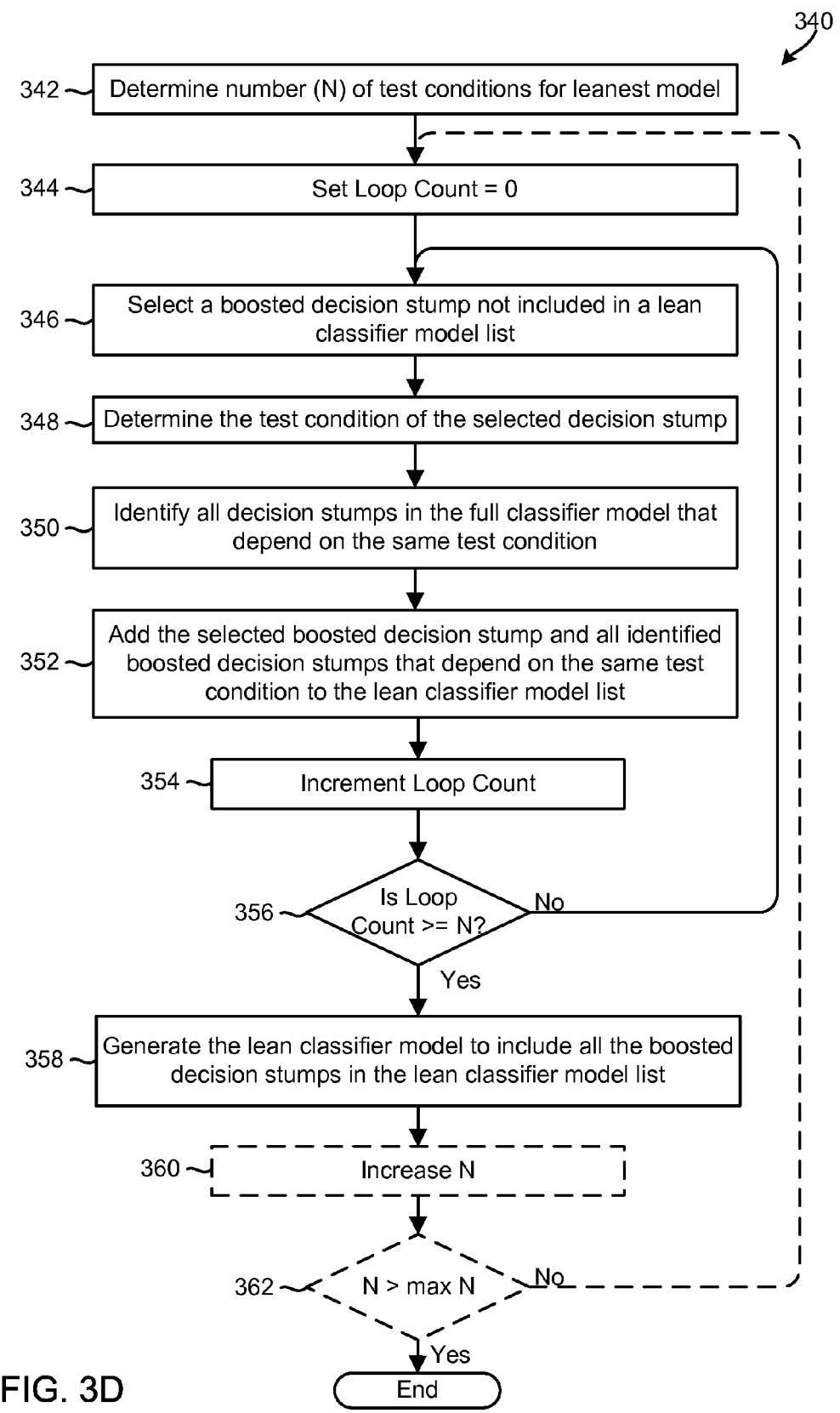
FIG. 3D is a process flow diagram illustrating yet another aspect method of generating and using a lean classifier model in the computing device.

In an alternative aspect method 340 illustrated in FIG. 3D the operations described above with reference to blocks 318 and 320 may be accomplished by sequentially selecting a boosted decision stump that is not already in the lean classifier model; identifying all other boosted decision stumps that depend upon the same computing device state, feature, behavior, or condition as the selected decision stump (and thus can be applied based upon one determination result); including in the lean classifier model the selected and all identified other boosted decision stumps that that depend upon the same computing device state, feature, behavior, or condition; and repeating the process for a number of times equal to the determined number of test conditions. Because all boosted decision stumps that depend on the same test condition as the selected boosted decision stump are added to the lean classifier model each time, limiting the number of times this process is performed will limit the number of test conditions included in the lean classifier model.

Referring to FIG. 3D, in block 342, the processing core may compute or determine a number (N) of unique test conditions (i.e., the computing device states, features, behaviors, or conditions that may be tested in boosted decision stumps) that should be evaluated in the lean classifier model. Computing or determining this number of unique test conditions may involve striking a balance or tradeoff between the consumption of processing, memory, or energy resources of the computing device required to apply the model, and the accuracy of the behavior classification that is to be achieved by the lean classifier model. Such a determination may include determining an amount of processing, memory, and/or energy resources available in the computing device, determining a priority and/or a complexity associated with the behavior that is to be analyzed, and balancing the available resources with the priority and/or complexity of the behavior.

In block 344, the processing core may set the value of a loop count variable to be equal to zero (0), or otherwise initiate a loop that will be performed the determined number N times. In block 346, the processing core may select a boosted decision stump that is included in, or generated from, the full set of boosted decision stumps and which is not included in a lean classifier model list. The first time through the loop there will be no boosted decision stumps in the lean classifier model list, so the first boosted decision stump will be selected. As mentioned herein, the full classifier model may be configured so that the first boosted decision stump in the full set has the highest probability of recognizing benign or non-benign behavior. In block 348, the processing core may determine the test condition associated with the selected decision stump. In block 350, the processing core may identify all of the decision stumps included in, or generated from, the full classifier model that depend on, include, or test the same test condition as the test condition of the selected decision stump. In block 352, the processing core may add the selected boosted decision stump and all of the identified boosted decision stumps that depend on, include, or test the same test condition to the lean classifier model list.

In block 354, the processing core may increment the value of the loop count variable. In determination block 356, the processing core may determine whether the value of the loop count variable is greater than or equal to the number N of unique test conditions determined in block 342. When the processing core determines that the value of the loop count variable is not greater than or equal to the number of unique test conditions (i.e., determination block 356="No"), the processing core may repeat the operations in blocks 346-354. When the processing core determines that the value of the loop count variable is greater than or equal to the number of unique test conditions (i.e., determination block 356="Yes"), in block 358, the processing core may generate the lean classifier model to include all the boosted decision stumps in the lean classifier model list.

This method 340 may be used a number of times to generate a family of lean classifier models of varying degrees of robustness or leanness by varying the number N of unique test conditions in the lean classifier model. For example, in optional block 360, the computing device processor may increase the number N of unique test conditions determined in block 342 in order to generate another lean classifier model that incorporates more test conditions. In optional determination block 362, the processor may determine whether the increase number N exceeds a maximum number (max N) of test conditions. The maximum number of test conditions may be determined (e.g., by a developer, service provider, user or via an algorithm) based on a maximum performance penalty or resource investment desired for assessing difficult-to-classify behaviors. If the increased number N is less than the maximum number max N (i.e., determination block 362="No"), the operations of blocks 344 through 360 described above may be repeated to generate another lean classifier model. Once the maximum number of unique test conditions have been included in a lean classifier model (i.e., determination block 362="Yes"), the process of generating lean classifier models may end.

While FIGS. 3A, 3B and 3D describe generating a family of lean classifier models by repeating the entire process of traversing the full set of boosted decision stumps, a similar result may be achieved by beginning with a generated lean classifier model (i.e., a model generated in any of blocks 308, 320 and 358) and traversing the full set of boosted decision stumps for the added number of test conditions adding to that model boosted decision stumps depending on a test condition not already included in the generated lean classifier model.

Also, while FIGS. 3A, 3B and 3D describe generating a family of lean classifier models from leanest to most robust, the lean classifier models may also be generated from most robust to leanest simply by beginning with a maximum number of test conditions (e.g., N=max N) and decreasing the number each time.

Figure 4A:
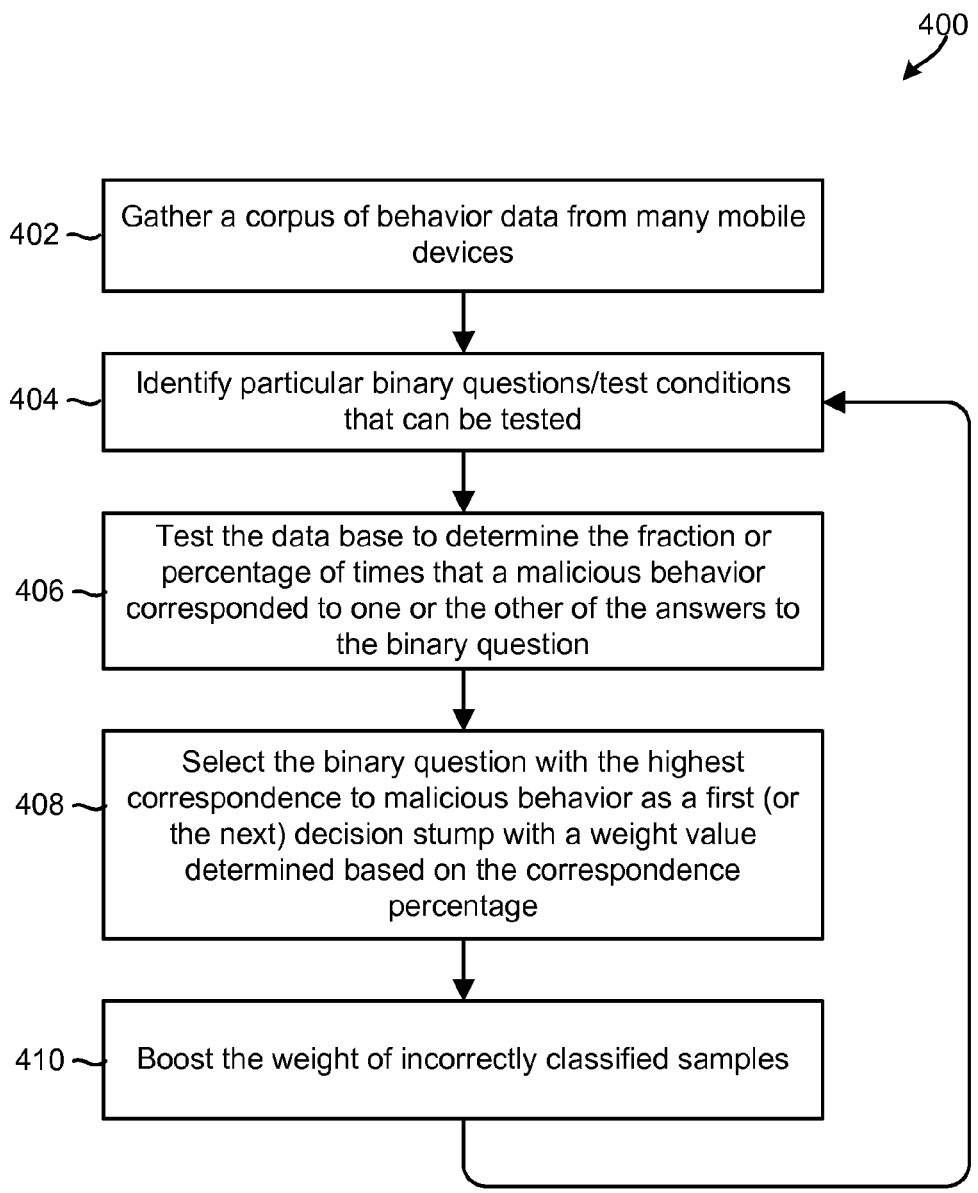
FIG. 4A is a process flow diagram illustrating a method of generating a full classifier model that includes boosted decision stumps that are suitable for use by a computing device in generating more focused and lean classifier models.

FIG. 4A illustrates an aspect method 400 of generating a full classifier model. Method 400 may be performed by a processor or processing core in resource constrained computing device, such as a mobile device.

In block 402, the processing core may receive or gather a corpus of behavior data (e.g., from many computing devices), including a large number of device states, configurations and behavior, as well as information regarding whether a malicious behavior was detected. In block 404, the processing core may identify particular binary questions/test conditions that can be tested within the device states, configurations and behavior from the corpus of behavior data. To characterize all of the device states, configurations and behaviors, a large number of such binary questions/test conditions will typically be identified. Then, in block 406, for each identified binary question, the processing core may test the data base to determine the fraction or percentage of times that a malicious behavior corresponded to one or the other of the answers to the binary question. In block 408, the processing core may select the binary question with the highest correspondence to non-benign behavior as a first decision stump with a weight value determined based on the correspondence percentage. In block 410, the processing core may boost the weight of the incorrectly classified samples/test conditions as described below with reference to FIG. 4B.

The processing core may then repeat the process of scanning the binary question assuming the answer of the first question is the value (e.g., "no") not associated with malicious behavior to identify the question with the highest correspondence to malicious behavior in this case. That question is then set as the second binary question in the model, with its weight value determined based on its correspondence percentage. The processing core may then repeat the process of scanning the binary question—assuming the answers of the first and questions/test conditions are the values (e.g., "no") not associated with malicious behavior—to identify the next question/test condition with the highest correspondence to malicious behavior in this case. That question/test condition is then the third binary question/test condition in the model, with its weight value determined based on its correspondence percentage. This process is continued through all of the identified binary questions/test conditions to build the complete set.

In the process of generating the binary questions/test conditions, processing core may evaluate data that has a range, such as the frequency of communications, or the number of communications within a previous time interval, and formulate a series of binary questions/test conditions that encompass the range in a manner that helps classify behaviors. Thus, one binary question/test condition might be whether the device has sent more than zero data transmissions within the previous five minutes (which might have a low correlation), a second binary question/test condition might be whether the device has sent more than 10 data transmissions in the previous five minutes (which might have a medium correlation), and a third question/test condition might be whether the device has sent more than 100 data transmissions within the previous five minutes (which might have a high correlation).

Some culling of the final set of questions/test conditions may be done by the processing core to remove those questions/test conditions whose determined weight or correlation to malicious behavior is less than a threshold value (e.g., less than statistically significant). For example, if the correlation to malicious behavior is approximately 50/50, there may be little benefit in using that decision stump as neither answer helps answer the question of whether current behavior is benign or non-benign.

Figure 4B:
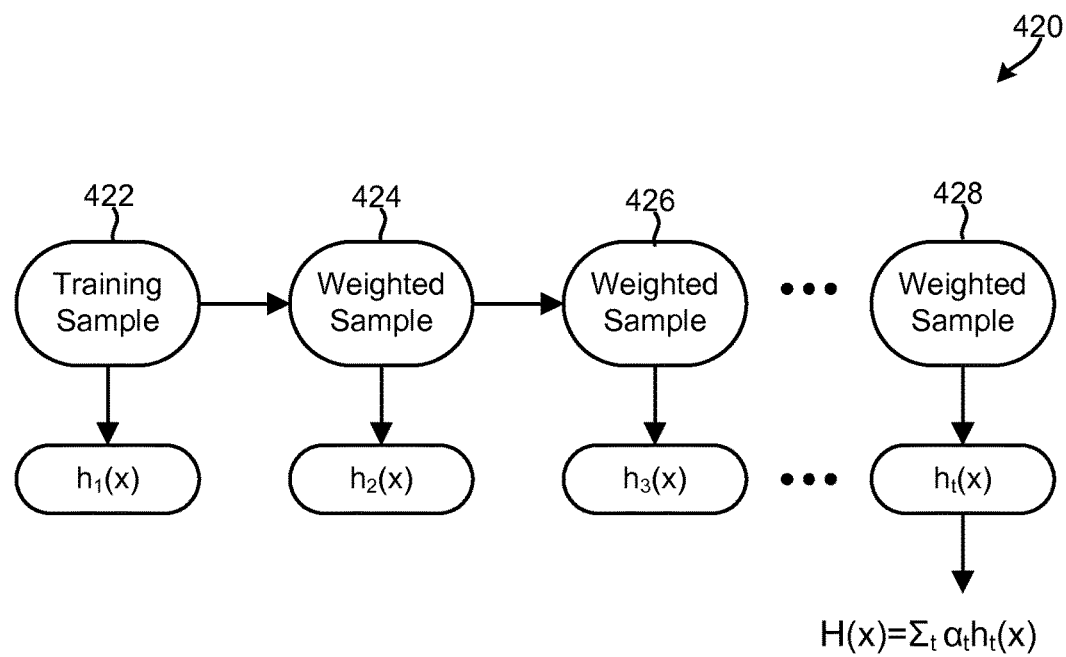
FIG. 4B is a process flow diagram illustrating an example method suitable for generating a boosted decision stump classifier in accordance with the various aspects.

FIG. 4B illustrates an example boosting method 420 suitable for generating a boosted decision tree/classifier that is suitable for use in accordance with various aspects. In operation 422, a processor or processing core may generate and/or execute a decision tree/classifier, collect a training sample from the execution of the decision tree/classifier, and generate a new classifier model (h1($x$)) based on the training sample. The training sample may include information collected from previous observations or analysis of device behaviors, software applications, or processes in that device. The training sample and/or new classifier model (h1($x$)) may be generated based the types of question or test conditions included in previous classifiers and/or based on accuracy or performance characteristics collected from the execution/application of previous data/behavior models or classifier models of a behavior analyzer module 204. In operation 424, the processor or processing core may boost (or increase) the weight of the entries that were misclassified by the generated decision tree/classifier (h1($x$)) to generate a second new tree/classifier (h2($x$)). In an aspect, the training sample and/or new classifier model (h2($x$)) may be generated based on the mistake rate of a previous execution or use (h1($x$)) of a classifier. In an aspect, the training sample and/or new classifier model (h2($x$)) may be generated based on attributes determined to have that contributed to the mistake rate or the misclassification of data points in the previous execution or use of a classifier.

In an aspect, the misclassified entries may be weighted based on their relatively accuracy or effectiveness. In operation 426, the processor or processing core may boost (or increase) the weight of the entries that were misclassified by the generated second tree/classifier (h2($x$)) to generate a third new tree/classifier (h3($x$)). In operation 428, the operations of 424-426 may be repeated to generate "t" number of new tree/classifiers ($h_t(x)$).

By boosting or increasing the weight of the entries that were misclassified by the first decision tree/classifier (h1($x$)), the second tree/classifier (h2($x$)) may more accurately classify the entities that were misclassified by the first decision tree/classifier (h1($x$)), but may also misclassify some of the entities that where correctly classified by the first decision tree/classifier (h1($x$)). Similarly, the third tree/classifier (h3($x$)) may more accurately classify the entities that were misclassified by the second decision tree/classifier (h2($x$)) and misclassify some of the entities that where correctly classified by the second decision tree/classifier (h2($x$)). That is, generating the family of tree/classifiers h1($x$)-$h_t(x)$ may not result in a system that converges as a whole, but results in a number of decision trees/classifiers that may be executed in parallel.

Figure 5:
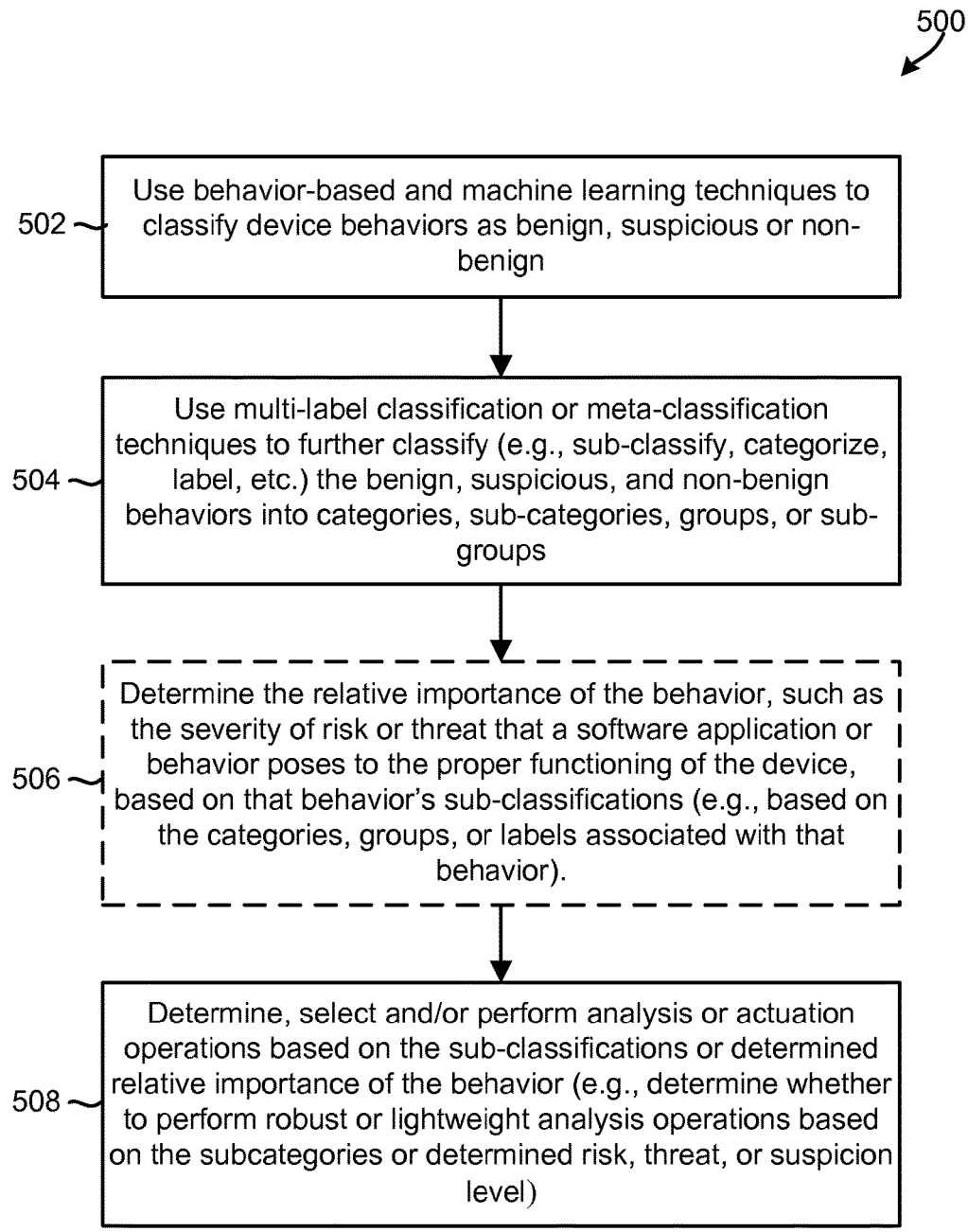
FIG. 5 is a process flow diagram illustrating a method for classifying and sub-classifying behaviors in accordance with an aspect.

FIG. 5 illustrates a method 500 of classifying and sub-classifying a behavior in accordance with an aspect. Method 500 may be performed by a processor or processing core in a mobile or resource constrained computing device. In block 502, the processing core may use behavior-based and machine learning techniques to classify device behaviors as benign, suspicious or non-benign. In block 504, the processing core may use multi-label classification or meta-classification techniques to further classify (e.g., sub-classify, categorize, label, etc.) the benign, suspicious, and non-benign behaviors into categories, sub-categories, groups, or sub-groups.

In optional block 506, the processing core may determine the relative importance of the behavior, such as the severity of risk or threat that a software application or behavior poses to the proper functioning of the device, based on that behavior's sub-classifications (e.g., based on the categories, groups, or labels associated with that behavior).

In block 508, the processing core may determine, select and/or perform analysis or actuation operations based on the sub-classifications or determined relative importance of the behavior (e.g., determine whether to perform robust or lightweight analysis operations based on the categories, groups, or labels associated with a behavior).

Figure 6:
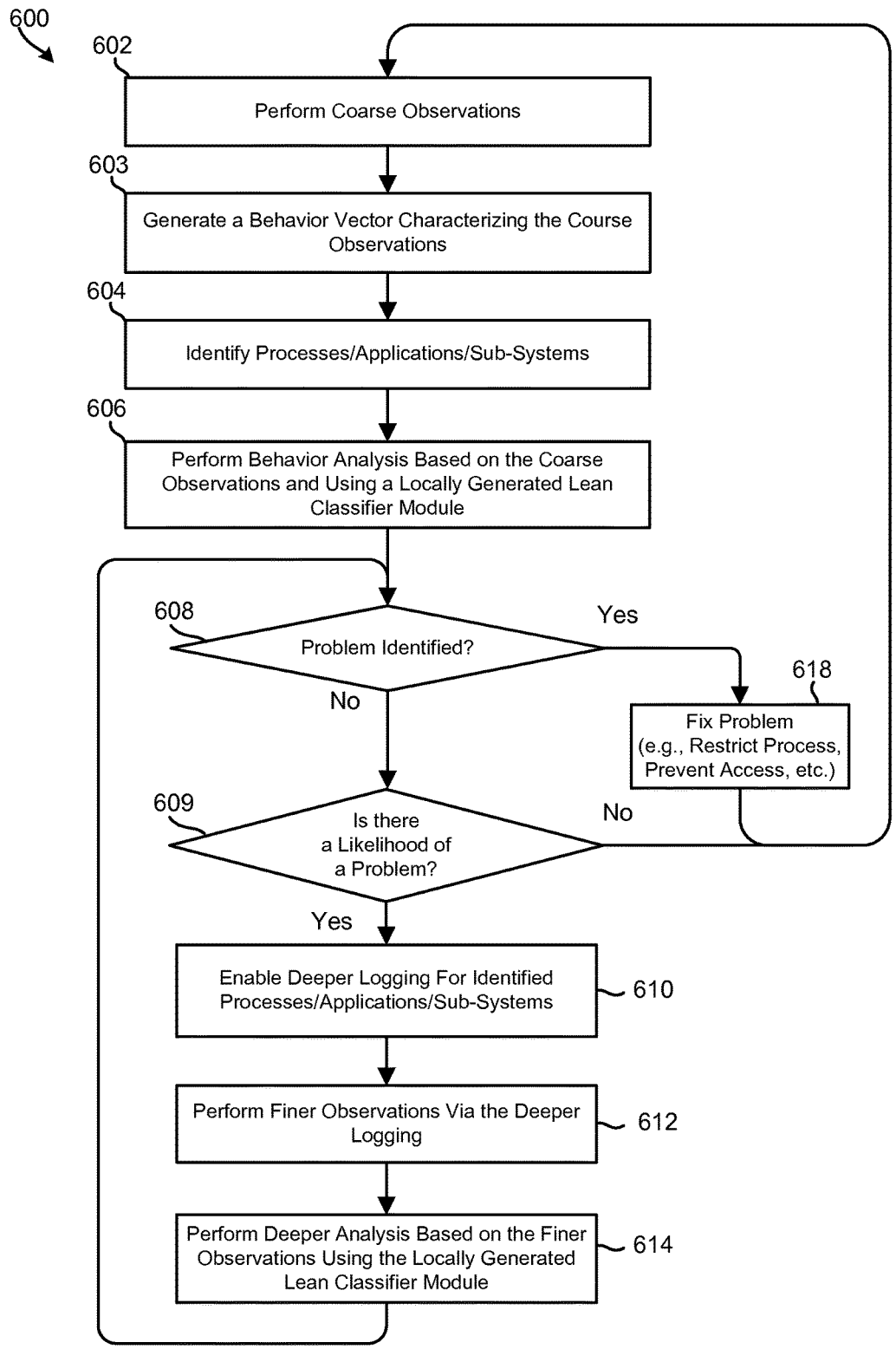
FIG. 6 is a process flow diagram illustrating a method for performing adaptive observations in accordance with an aspect.

FIG. 6 illustrates an example method 600 for performing dynamic and adaptive observations in accordance with an aspect. In block 602, a device processor may perform coarse observations by monitoring/observing a subset of a large number factors/behaviors that could contribute to the mobile device's degradation. In block 603, the device processor may generate a behavior vector characterizing the coarse observations and/or the mobile device behavior based on the coarse observations.

In block 604, the device processor may identify subsystems, processes, and/or applications associated with the coarse observations that may potentially contribute to the mobile device's degradation. This may be achieved, for example, by comparing information received from multiple sources with contextual information received from sensors of the mobile device. In block 606, the device processor may perform behavioral analysis operations based on the coarse observations. In an aspect, as part of blocks 603 and 604, the device processor may perform one or more of the operations discussed above with reference to FIGS. 2-10.

In determination block 608, the device processor may determine whether suspicious behaviors or potential problems can be identified and corrected based on the results of the behavioral analysis. When the device processor determines that the suspicious behaviors or potential problems can be identified and corrected based on the results of the behavioral analysis (i.e., determination block 608="Yes"), the processor may initiate a process to correct the behavior in block 618, and perform additional coarse observations in block 602.

When the device processor determines that the suspicious behaviors or potential problems cannot be identified and/or corrected based on the results of the behavioral analysis (i.e., determination block 608="No"), the device processor may determine whether there is a likelihood of a problem in determination block 609. In an aspect, the device processor may determine that there is a likelihood of a problem by computing a probability of the mobile device encountering potential problems and/or engaging in suspicious behaviors, and determining whether the computed probability is greater than a predetermined threshold.

When the device processor determines that the computed probability is not greater than the predetermined threshold and/or there is not a likelihood that suspicious behaviors or potential problems exist and/or are detectable (i.e., determination block 609="No"), the processor may perform additional coarse observations in block 612.

When the device processor determines that there is a likelihood that suspicious behaviors or potential problems exist and/or are detectable (i.e., determination block 609="Yes"), the device processor may perform deeper logging/observations or final logging on the identified subsystems, processes or applications in block 610. In block 612, the device processor may perform deeper and more detailed observations on the identified subsystems, processes or applications. In block 614, the device processor may perform further and/or deeper behavioral analysis based on the deeper and more detailed observations. In determination block 608, the device processor may again determine whether the suspicious behaviors or potential problems can be identified and corrected based on the results of the deeper behavioral analysis.

When the device processor determines that the suspicious behaviors or potential problems cannot be identified and corrected based on the results of the deeper behavioral analysis (i.e., determination block 608="No"), the processor may repeat the operations in blocks 610-614 until the level of detail is fine enough to identify the problem or until it is determined that the problem cannot be identified with additional detail or that no problem exists.

When the device processor determines that the suspicious behaviors or potential problems can be identified and corrected based on the results of the deeper behavioral analysis (i.e., determination block 608="Yes"), the device processor may perform operations to correct the problem/behavior in block 618, and the processor may perform additional operations in block 602

In an aspect, as part of blocks 602-618 of the method 600, the device processor may perform real-time behavior analysis of the system's behaviors to identify suspicious behaviors from limited and coarse observations, to dynamically determine the behaviors to observe in greater detail, and to dynamically determine the precise level of detail required for the observations. This enables the device processor to efficiently identify and prevent problems from occurring, without requiring the use of a large amount of processor, memory, or battery resources on the device.

Figure 7:
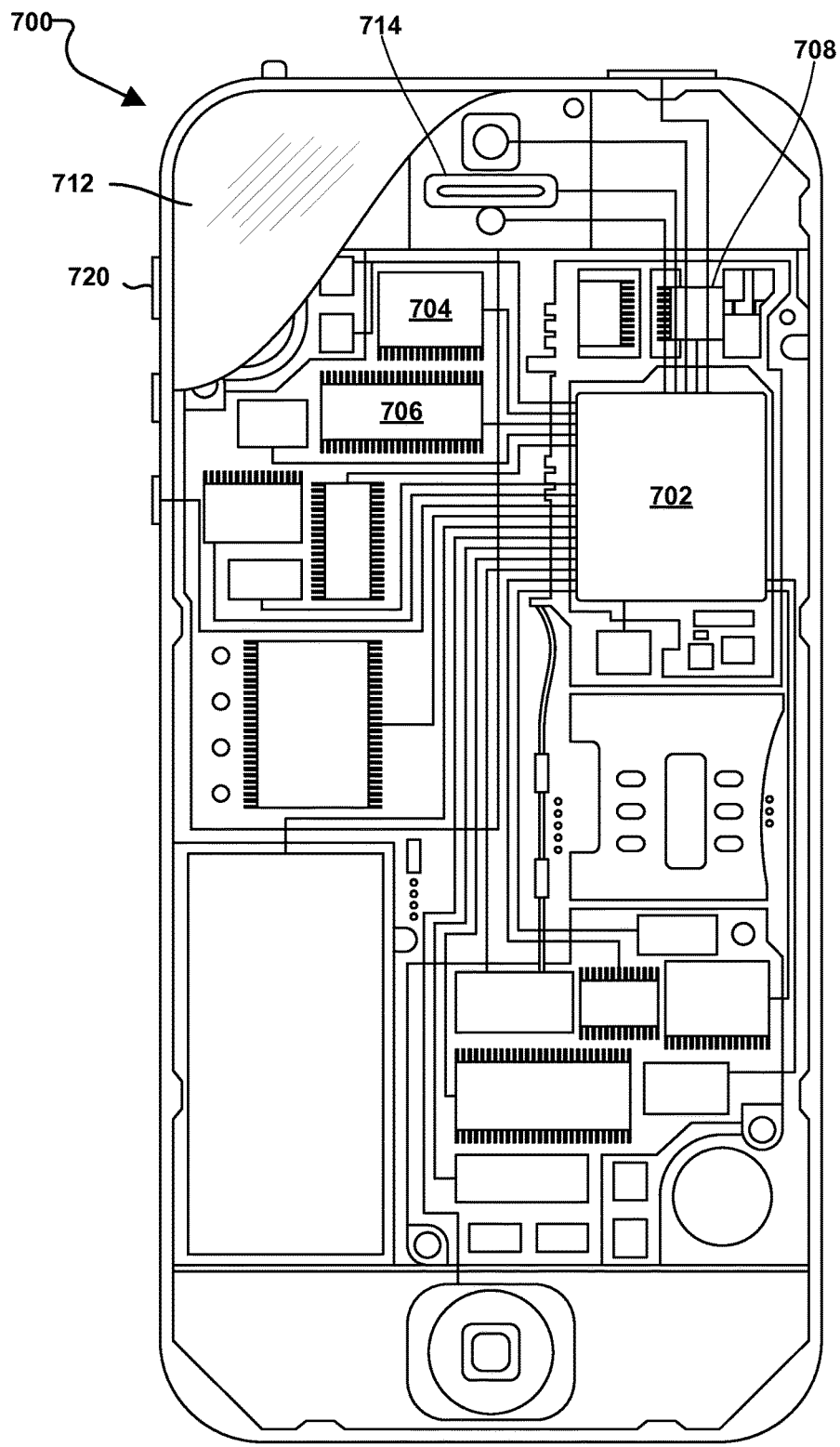
FIG. 7 is a component block diagram of a mobile device suitable for use in an aspect.

The various aspects may be implemented on a variety of computing devices, an example of which is illustrated in FIG. 7 in the form of a smartphone. A smartphone 700 may include a processor 702 coupled to internal memory 704, a display 712, and to a speaker 714. Additionally, the smartphone 700 may include an antenna for sending and receiving electromagnetic radiation that may be connected to a wireless data link and/or cellular telephone transceiver 708 coupled to the processor 702. Smartphones 700 typically also include menu selection buttons or rocker switches 720 for receiving user inputs.

A typical smartphone 700 also includes a sound encoding/decoding (CODEC) circuit 706, which digitizes sound received from a microphone into data packets suitable for wireless transmission and decodes received sound data packets to generate analog signals that are provided to the speaker to generate sound. Also, one or more of the processor 702, wireless transceiver 708 and CODEC 706 may include a digital signal processor (DSP) circuit (not shown separately).

The processors 702 may be any programmable microprocessor, microcomputer or multiple processor chip or chips that can be configured by software instructions (applications) to perform a variety of functions, including the functions of the various aspects described below. In some mobile devices, multiple processors 702 may be provided, such as one processor dedicated to wireless communication functions and one processor dedicated to running other applications. Typically, software applications may be stored in the internal memory 704 before they are accessed and loaded into the processor 702. The processor 702 may include internal memory sufficient to store the application software instructions.

A number of different cellular and mobile communication services and standards are available or contemplated in the future, all of which may implement and benefit from the various aspects. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The term "performance degradation" is used in this application to refer to a wide variety of undesirable computing device operations and characteristics, such as longer processing times, slower real time responsiveness, lower battery life, loss of private data, malicious economic activity (e.g., sending unauthorized premium SMS message), denial of service (DoS), operations relating to commandeering the computing device or utilizing the phone for spying or botnet activities, etc.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples, and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method of evaluating device behaviors in a computing device, comprising:
   using a behavior-based machine learning technique to classify a device behavior as one of benign, suspicious, and non-benign;
   using one of a multi-label classification technique and a meta-classification technique to sub-classify the device behavior into a sub-classification that includes one or more sub-categories;
   determining a relative importance of the device behavior based on the sub-classification comprising determining whether the device behavior is sub-classified into a low risk sub-category; and
   determining whether to perform robust behavior-based operations based on the relative importance of the device behavior comprising displaying a prompt that requests that a user of the computing device choose whether to uninstall or whitelist a software application program associated with the device behavior in response to determining that the device behavior is sub-classified into the low risk sub-category.

2. The method of claim 1, wherein:
   using the behavior-based machine learning technique to classify the device behavior as one of benign, suspicious, and non-benign comprises classifying the device behavior as a suspicious device behavior; and
   using one of the multi-label classification technique and the meta-classification technique to sub-classify the device behavior into the one or more sub-categories comprises sub-classifying the suspicious device behavior into a sub-category selected from the group consisting of:
   Adware;
   Key Logger;
   Ransomware;
   Spyware;
   mRAT;
   Botnet;
   Phishing;
   Trojan; and
   SMS Fraudware.

3. The method of claim 1, wherein determining the relative importance of the device behavior based on the sub-classification further comprises determining a severity of risk posed by the device behavior to the proper functioning of the computing device.

4. The method of claim 3, further comprising balancing tradeoffs between amounts of processing, memory, or energy resources of the computing device that are used to analyze the device behavior and the severity of risk posed by the device behavior.

5. The method of claim 1, further comprising determining actuation operations based on the relative importance of the device behavior.

6. The method of claim 1, wherein:
   determining the relative importance of the device behavior based on the sub-classification further comprises determining whether the device behavior is sub-classified into a high risk sub-category; and
   determining whether to perform the robust behavior-based operations based on the relative importance of the device behavior further comprises immediately terminating a software application program associated with the device behavior in response to determining that the device behavior is sub-classified into the high risk sub-category.

7. The method of claim 1, wherein:
   determining the relative importance of the device behavior based on the sub-classification further comprises determining whether the device behavior is sub-classified into a high risk sub-category; and
   determining whether to perform the robust behavior-based operations based on the relative importance of the device behavior further comprises:
     performing robust analysis operations to determine with a high degree of confidence whether the device behavior is non-benign in response to determining that the device behavior is sub-classified into a high risk sub-category; and
     automatically terminating a software application program associated with the device behavior in response to determining with the high degree of confidence that the device behavior is non-benign.

8. The method of claim 1, wherein using one of the multi-label classification technique and the meta-classification technique to sub-classify the device behavior into the one or more sub-categories comprises applying a behavior vector information structure to one of a multi-classification classifier model and a meta-classifier model.

9. A computing device, comprising:
means for using a behavior-based machine learning technique to classify a device behavior as one of benign, suspicious, and non-benign;
means for using one of a multi-label classification technique and a meta-classification technique to sub-classify the device behavior into a sub-classification that includes one or more sub-categories;
means for determining a relative importance of the device behavior based on the sub-classification comprising means for determining whether the device behavior is sub-classified into a low risk sub-category; and
means for determining whether to perform robust behavior-based operations based on the relative importance of the device behavior comprising means for displaying a prompt that requests that a user of the computing device choose whether to uninstall or whitelist a software application program associated with the device behavior in response to determining that the device behavior is sub-classified into the low risk sub-category.

10. The computing device of claim 9, wherein:
means for using the behavior-based machine learning technique to classify the device behavior as one of benign, suspicious, and non-benign comprises means for classifying the device behavior as a suspicious device behavior; and
means for using one of the multi-label classification technique and the meta-classification technique to sub-classify the device behavior into the one or more sub-categories comprises means for sub-classifying the suspicious device behavior into a sub-category selected from the group consisting of:
Adware;
Key Logger;
Ransomware;
Spyware;
mRAT;
Botnet;
Phishing;
Trojan; and
SMS Fraudware.

11. The computing device of claim 9, wherein means for determining the relative importance of the device behavior based on the sub-classification further comprises means for determining a severity of risk posed by the device behavior to the proper functioning of the computing device, the computing device further comprising:
means for balancing tradeoffs between amounts of processing, memory, or energy resources used to analyze the device behavior and the severity of risk posed by the device behavior.

12. The computing device of claim 9, wherein means for determining the relative importance of the device behavior based on the sub-classification and means for determining whether to perform the robust behavior-based operations based on the relative importance of the device behavior comprise:
means for determining whether the device behavior is sub-classified into a high risk sub-category; and
means for immediately terminating a software application program associated with the device behavior in response to determining that the device behavior is sub-classified into the high risk sub-category.

13. The computing device of claim 9, wherein means for determining the relative importance of the device behavior based on the sub-classification and means for determining whether to perform the robust behavior-based operations based on the relative importance of the device behavior comprise:
means for determining whether the device behavior is sub-classified into a high risk sub-category;
means for performing robust analysis operations to determine with a high degree of confidence whether the device behavior is non-benign in response to determining that the device behavior is sub-classified into a high risk sub-category; and
means for automatically terminating a software application program associated with the device behavior in response to determining with the high degree of confidence that the device behavior is non-benign.

14. The computing device of claim 9, wherein means for using one of the multi-label classification technique and the meta-classification technique to sub-classify the device behavior into the one or more sub-categories comprises means for applying a behavior vector information structure to one of a multi-classification classifier model and a meta-classifier model.

15. A computing device, comprising:
a memory; and
a processor coupled to the memory and configured with processor-executable instructions to perform operations comprising:
using a behavior-based machine learning technique to classify a device behavior as one of benign, suspicious, and non-benign;
using one of a multi-label classification technique and a meta-classification technique to sub-classify the device behavior into a sub-classification that includes one or more sub-categories;
determining a relative importance of the device behavior based on the sub-classification comprising determining whether the device behavior is sub-classified into a low risk sub-category; and
determining whether to perform robust behavior-based operations based on the relative importance of the device behavior comprising displaying a prompt that requests that a user of the computing device choose whether to uninstall or whitelist a software application program associated with the device behavior in response to determining that the device behavior is sub-classified into the low risk sub-category.

16. The computing device of claim 15, wherein the processor is configured with processor-executable instructions to perform operations such that:
using the behavior-based machine learning technique to classify the device behavior as one of benign, suspicious, and non-benign comprises classifying the device behavior as a suspicious device behavior; and
using one of the multi-label classification technique and the meta-classification technique to sub-classify the device behavior into the one or more sub-categories comprises sub-classifying the suspicious device behavior into a sub-category selected from the group consisting of:
Adware;
Key Logger;
Ransomware;
Spyware;

mRAT;
Botnet;
Phishing;
Trojan; and
SMS Fraudware.

17. The computing device of claim 15, wherein:
the processor is configured with processor-executable instructions to perform operations such that determining the relative importance of the device behavior based on the sub-classification further comprises determining a severity of risk posed by the device behavior to the proper functioning of the computing device; and
the processor is configured with processor-executable instructions to perform operations further comprising balancing tradeoffs between amounts of processing, memory, or energy resources used to analyze the device behavior and the severity of risk posed by the device behavior.

18. The computing device of claim 15, wherein the processor is configured with processor-executable instructions to perform operations such that:
determining the relative importance of the device behavior based on the sub-classification further comprises determining whether the device behavior is sub-classified into a high risk sub-category; and
determining whether to perform the robust behavior-based operations based on the relative importance of the device behavior further comprises immediately terminating a software application program associated with the device behavior in response to determining that the device behavior is sub-classified into the high risk sub-category.

19. The computing device of claim 15, wherein the processor is configured with processor-executable instructions to perform operations such that:
determining the relative importance of the device behavior based on the sub-classification further comprises determining whether the device behavior is sub-classified into a high risk sub-category; and
determining whether to perform the robust behavior-based operations based on the relative importance of the device behavior further comprises:
performing robust analysis operations to determine with a high degree of confidence whether the device behavior is non-benign in response to determining that the device behavior is sub-classified into a high risk sub-category; and
automatically terminating a software application program associated with the device behavior in response to determining with the high degree of confidence that the device behavior is non-benign.

20. The computing device of claim 15, wherein the processor is configured with processor-executable instructions to perform operations such that using one of the multi-label classification technique and the meta-classification technique to sub-classify the device behavior into the one or more sub-categories comprises applying a behavior vector information structure to one of a multi-classification classifier model and a meta-classifier model.

21. A non-transitory computer readable storage medium having stored thereon processor-executable software instructions configured to cause a processor to perform operations for evaluating device behaviors in a computing device, the operations comprising:
using a behavior-based machine learning technique to classify a device behavior as one of benign, suspicious, and non-benign;
using one of a multi-label classification technique and a meta-classification technique to sub-classify the device behavior into a sub-classification that includes one or more sub-categories;
determining a relative importance of the device behavior based on the sub-classification comprising determining whether the device behavior is sub-classified into a low risk sub-category; and
determining whether to perform robust behavior-based operations based on the relative importance of the device behavior comprising displaying a prompt that requests that a user of the computing device choose whether to uninstall or whitelist a software application program associated with the device behavior in response to determining that the device behavior is sub-classified into the low risk sub-category.

22. The non-transitory computer readable storage medium of claim 21, wherein the stored processor-executable software instructions are configured to cause a processor to perform operations such that:
using the behavior-based machine learning technique to classify the device behavior as one of benign, suspicious, and non-benign comprises classifying the device behavior as a suspicious device behavior; and
using one of the multi-label classification technique and the meta-classification technique to sub-classify the device behavior into the one or more sub-categories comprises sub-classifying the suspicious device behavior into a sub-category selected from the group consisting of:
Adware;
Key Logger;
Ransomware;
Spyware;
mRAT;
Botnet;
Phishing;
Trojan; and
SMS Fraudware.

23. The non-transitory computer readable storage medium of claim 21, wherein:
the stored processor-executable software instructions are configured to cause a processor to perform operations such that determining the relative importance of the device behavior based on the sub-classification further comprises determining a severity of risk posed by the device behavior to the proper functioning of the computing device; and
the stored processor-executable software instructions are configured to cause a processor to perform operations further comprising balancing tradeoffs between amounts of processing, memory, or energy resources used to analyze the device behavior and the severity of risk posed by the device behavior.

24. The non-transitory computer readable storage medium of claim 21, wherein the stored processor-executable software instructions are configured to cause a processor to perform operations such that:
determining the relative importance of the device behavior based on the sub-classification further comprises determining whether the device behavior is sub-classified into a high risk sub-category; and
determining whether to perform the robust behavior-based operations based on the relative importance of the device behavior further comprises immediately terminating a software application program associated with the device behavior in response to determining that the device behavior is sub-classified into the high risk sub-category.

25. The non-transitory computer readable storage medium of claim 21, wherein the stored processor-executable software instructions are configured to cause a processor to perform operations such that:
   determining the relative importance of the device behavior based on the sub-classification further comprises determining whether the device behavior is sub-classified into a high risk sub-category; and
   determining whether to perform the robust behavior-based operations based on the relative importance of the device behavior further comprises:
      performing robust analysis operations to determine with a high degree of confidence whether the device behavior is non-benign in response to determining that the device behavior is sub-classified into a high risk sub-category; and
      automatically terminating a software application program associated with the device behavior in response to determining with the high degree of confidence that the device behavior is non-benign.

26. The non-transitory computer readable storage medium of claim 21, wherein the stored processor-executable software instructions are configured to cause a processor to perform operations such that using one of the multi-label classification technique and the meta-classification technique to sub-classify the device behavior into the one or more sub-categories comprises applying a behavior vector information structure to one of a multi-classification classifier model and a meta-classifier model.

* * * * *